US012054182B2

(12) United States Patent
Nasrabad et al.

(10) Patent No.: US 12,054,182 B2
(45) Date of Patent: Aug. 6, 2024

(54) RAILROAD FREIGHT CAR ACCESS FITTINGS

(71) Applicant: NATIONAL STEEL CAR LIMITED, Hamilton (CA)

(72) Inventors: Maryam Mansouri Nasrabad, Ancaster (CA); Mohamed Al-Kaabi, Hamilton (CA); Max Vanderby, Hamilton (CA); Kenneth Wayne Black, Hamilton (CA); Tomasz Bis, Ancaster (CA)

(73) Assignee: National Steel Car Limited, Hamilton (CA)

( * ) Notice: Subject to any disclaimer, the term of this patent is extended or adjusted under 35 U.S.C. 154(b) by 1115 days.

(21) Appl. No.: 16/878,076

(22) Filed: May 19, 2020

(65) Prior Publication Data

US 2020/0276992 A1 Sep. 3, 2020

Related U.S. Application Data

(62) Division of application No. 15/592,879, filed on May 11, 2017, now Pat. No. 10,689,012.

(51) Int. Cl.

| | |
|---|---|
| ***B61D 23/00*** | (2006.01) |
| ***B61D 3/20*** | (2006.01) |
| ***E06C 5/02*** | (2006.01) |
| ***E06C 5/22*** | (2006.01) |
| ***E06C 7/04*** | (2006.01) |
| ***E06C 7/18*** | (2006.01) |

(52) U.S. Cl.
CPC ............... *B61D 23/00* (2013.01); *B61D 3/20* (2013.01); *E06C 5/02* (2013.01); *E06C 5/22* (2013.01); *E06C 7/04* (2013.01); *E06C 7/182* (2013.01)

(58) Field of Classification Search
CPC .......... B61D 23/00; B61D 23/02; B61D 3/20; E06C 5/00; E06C 5/02; E06C 5/04; E06C 5/22; E06C 7/02; E06C 7/04; E06C 7/182
See application file for complete search history.

(56) References Cited

U.S. PATENT DOCUMENTS

| | | | |
|---|---|---|---|
| 1,118,404 | A | 11/1914 | Dunderdal |
| 1,179,665 | A | 4/1916 | Shank |
| 2,090,494 | A | 8/1937 | Willoughby |
| 2,164,586 | A | 7/1939 | McBride |

(Continued)

FOREIGN PATENT DOCUMENTS

| | | |
|---|---|---|
| CA | 2795623 | 5/2014 |
| CN | 201049632 | 4/2008 |

(Continued)

*Primary Examiner* — Zachary L Kuhfuss
*Assistant Examiner* — Cheng Lin
(74) *Attorney, Agent, or Firm* — Hahn Loeser & Parks LLP; Nathan B. Webb

(57) ABSTRACT

A railroad freight car may have external fittings, such as trackside-accessible ladder fittings that permit personnel to climb onto the decks and walkways of the car. Several embodiments of movable ladder assemblies are described that provide an extended or deployed or raised position of a handhold, and a retracted or lowered, or stored position. In other embodiments, the assembly is provided with a compliant member that allows the handhold resiliently to flex when encountered by solid objects such as shipping containers.

22 Claims, 19 Drawing Sheets

(56) References Cited

U.S. PATENT DOCUMENTS

| | | | | | |
|---|---|---|---|---|---|
| 4,169,623 | A | | 10/1979 | Smith | |
| 5,154,125 | A | * | 10/1992 | Renner | B61D 23/02 105/349 |
| 5,423,269 | A | | 6/1995 | Saxton et al. | |
| 5,520,489 | A | | 5/1996 | Butcher et al. | |
| 5,743,191 | A | | 4/1998 | Coslovi | |
| 6,058,875 | A | * | 5/2000 | Krish, Jr. | E06C 5/02 114/362 |
| 6,378,654 | B1 | * | 4/2002 | Ziaylek, Jr. | E06C 5/02 182/127 |
| 6,543,368 | B1 | | 4/2003 | Forbes | |
| 8,919,497 | B2 | * | 12/2014 | Rund | B60R 3/02 182/86 |
| 8,950,341 | B2 | | 2/2015 | Boring et al. | |
| 8,973,508 | B2 | | 3/2015 | Al-Kaabi et al. | |
| 2005/0211502 | A1 | * | 9/2005 | LaBrash | B60R 3/02 182/127 |
| 2008/0060545 | A1 | * | 3/2008 | Barbara | B61D 23/00 105/443 |
| 2011/0265685 | A1 | | 11/2011 | Swygert | |
| 2014/0261071 | A1 | | 9/2014 | Zaerr et al. | |
| 2015/0027341 | A1 | * | 1/2015 | Henrici | B61D 23/00 105/443 |
| 2015/0197198 | A1 | * | 7/2015 | Egner | E06C 1/125 182/77 |
| 2015/0232106 | A1 | | 8/2015 | Boring et al. | |
| 2017/0327132 | A1 | | 11/2017 | Huck | |
| 2018/0001906 | A1 | | 1/2018 | Cruz-Saldivar | |
| 2018/0001915 | A1 | | 1/2018 | Richmond | |
| 2018/0050707 | A1 | * | 2/2018 | Culbertson | B61D 3/08 |
| 2018/0106108 | A1 | | 4/2018 | Savoy | |
| 2018/0297618 | A1 | | 10/2018 | Vanderby | |
| 2018/0327002 | A1 | | 11/2018 | Nasrabad | |

FOREIGN PATENT DOCUMENTS

| | | | | | |
|---|---|---|---|---|---|
| CN | 201432682 | | | 3/2010 | |
| DE | 19544305 | | | 6/1997 | |
| FR | 2647499 | | | 11/1990 | |
| JP | 2013507544 | A | * | 3/2013 | E06C 1/12 |
| SE | 502863 | | | 2/1996 | |

* cited by examiner

RAILROAD FREIGHT CAR ACCESS FITTINGS

This application is a divisional of U.S. patent application Ser. No. 15/592,879, filed May 11, 2017, the specifications thereof being incorporated by reference herein.

FIELD OF THE INVENTION

This invention relates to the field of railroad freight car access fittings.

BACKGROUND

Railroad freight cars have long been known in railroad use in North America. They generally have external access fittings in the nature of access ladders mounted at the points or corners of the car or car body. In some kinds of cars, as for example flat cars, well cars or spine cars, the styles, or handholds, of the access ladders may stand upwardly of surrounding structure, and may be vulnerable to contact by moving objects.

SUMMARY OF THE INVENTION

In an aspect of the invention there is a trackside deck access assembly for a railroad freight car. It has a fixed portion and at least one movable portion. The fixed portion is mountable to body structure of the railroad freight car. The fixed portion includes at least a first step and a pair of spaced apart ladder stanchions. The at least one movable portion has at least one of a left hand handhold and a right hand handhold. The movable portion is movable between a deployed position and a retracted position. In the deployed position the handholds are raised relative to the fixed portion. The movable portion being releasably securable in the deployed position and in the retracted position.

In a feature of that aspect of the invention, the fixed portion includes at least a second step spaced upwardly from the first step. In another feature, the assembly includes a left hand handhold and a right hand handhold, each of them being movable independently of the other. In another feature, the at least one movable portion is a single movable portion that includes both left hand and right hand handholds. In still another feature, any movable portion thereof includes an upwardly slidable hollow post member, and a handhold rail mounted thereto. In still another feature, any movable portion thereof includes an axial member mounted slidably to one of the stanchions, and is mounted to move between deployed and retracted positions guided by the one of the stanchions. In still another feature, any movable portion thereof is releasably engaged in any one of the deployed position and the retracted position by means of a spring-biased indexing member. In still yet another feature, any movable portion thereof is hingedly mounted to any one of the stanchions thereof. In a still further feature, the movable portion includes first and second spaced apart uprights and first and second spaced-apart cross-members mounted thereto. The uprights are mounted to move slidably relative to, and to be guided in motion by, the stanchions. The cross-members define steps located upwardly of the first step. In a still further feature, the movable portion includes a U-shaped member pivotally mounted to the stanchions. The U-shaped member has a back and a pair of first and second spaced apart legs. The back of the U-shaped member defines a ladder step. The first and second arms define handholds movable to an upright condition when deployed.

The assembly includes a releasable lock operable to restrain the handholds in the upright condition.

In another aspect of the invention there is a trackside access assembly for a railroad freight car. It has a fixed portion mounted to body structure of the railroad freight car. There is a movable portion mounted to the fixed portion. The movable portion is resiliently displaceable relative to the fixed portion.

In a feature of that aspect of the invention, the movable portion includes at least one spring. The spring is connected to one of (a) the fixed portion; and (b) the body portion. In another feature, the movable portion includes left hand and right hand handholds. The left hand handhold is mounted to a first spring and the right hand handhold is mounted to a second spring. The first and second springs are mounted to the fixed portion. In another feature, the spring has slope continuity of connection with both the fixed portion and the movable portion. In a further feature, the spring defines a mechanical fuse between the fixed portion and the movable portion. In another feature, the spring is a coil spring. One end of the coil spring defines a socket for an upper part of the fixed portion. An opposite end of the spring defines a socket for a lower part of the movable portion. The coil spring defines a flexible coupling between the fixed portion and the movable portion. In another feature, the spring has a first end rigidly welded to the fixed portion and a second end rigidly welded to the movable portion. In still another feature, the spring has a first end mounted inside the fixed portion and a second end mounted inside the movable portion. In yet another feature, the spring has a first portion that is cylindrical, and a second portion that is tapered. The fixed portion and the movable portion have a ball and socket engagement within the spring.

These and other aspects and features of the invention may be understood with reference to the description which follows, and with the aid of the illustrations of a number of examples. The various features identified above may be combined with the aspects in many combinations and permutations.

BRIEF DESCRIPTION OF THE FIGURES

The description is accompanied by a set of illustrative Figures in which.

DETAILED DESCRIPTION

Figure 1A:
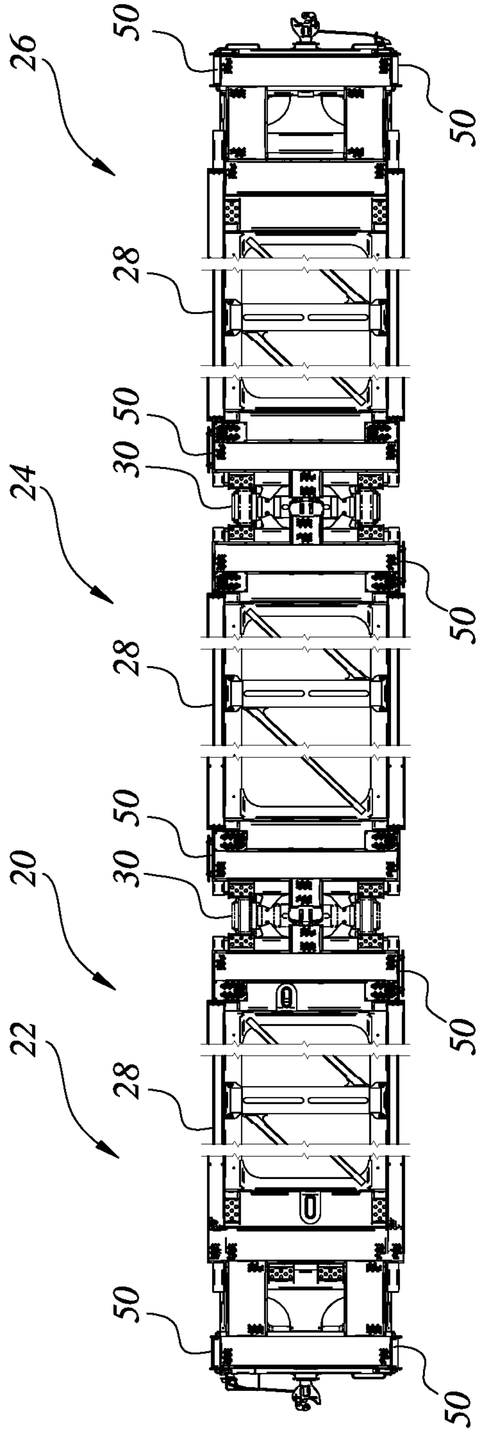
FIG. 1*a* is a top view of an articulated railroad well car.

The description that follows, and the embodiments described therein, are provided by way of illustration of an example, or examples, of particular embodiments of the principles, aspects, or features of the present invention (or inventions, as may be). These examples are provided for the purposes of explanation, and not of limitation, of those principles and of the invention. In the specification, like parts are marked throughout the descriptive text and the drawings with the same respective reference numerals. The drawings are generally to scale, and may be taken as being to scale unless otherwise noted. Unless noted otherwise, the structural members of the car may be taken as being fabricated from steel.

The terminology used herein is thought to be consistent with the customary and ordinary meanings of those terms as understood by a person of ordinary skill in the railroad industry in North America. Following from decision of the CAFC in *Phillips v. AWH Corp*., the Applicant expressly excludes all interpretations that are inconsistent with this specification, and, in particular, expressly excludes any interpretation of the claims or the language used in this specification such as may be made in the USPTO, or in any other Patent Office, other than those interpretations for which express support can be demonstrated in this specification or in objective evidence of record in accordance with In re Lee, (for example, earlier publications by persons not employed by the USPTO or any other Patent Office), demonstrating how the terms are used and understood by persons of ordinary skill in the art.

In terms of general orientation and directional nomenclature, for railroad cars described herein the longitudinal direction is defined as being coincident with the rolling direction of the railroad car, or railroad car unit, when located on tangent (that is, straight) track. Unless otherwise noted, vertical, or upward and downward, are terms that use top of rail, TOR, as a datum. In the context of the car as a whole, the term lateral, or laterally outboard, or transverse, or transversely outboard refer to a distance or orientation relative to the longitudinal centerline of the railroad car, or car unit, or of the centerline of a centerplate at a truck center. The term "longitudinally inboard", or "longitudinally outboard" is a distance taken relative to a mid-span lateral section of the well car unit body. The commonly used engineering terms "proud", "flush" and "shy" may be used herein to denote items that, respectively, protrude beyond an adjacent element, are level with an adjacent element, or do not extend as far as an adjacent element, the terms corresponding conceptually to the conditions of "greater than", "equal to" and "less than". The directions correspond generally to a Cartesian frame of reference in which the x-direction is longitudinal or lengthwise, the y-direction is lateral or cross-wise, and the z-direction is vertical.

Given that the railroad well car described herein may tend to have both longitudinal and transverse axes of symmetry, a description of one half of the car may generally also be intended to describe the other half as well, allowing for differences between right hand and left hand parts. The abbreviation kpsi stands for thousand of pounds per square inch. To the extent that this specification or the accompanying illustrations may refer to standards of the Association of American Railroads (AAR), such as to AAR plate sizes, those references are to be understood as at the earliest date of priority to which this application is entitled.

Figure 1B:
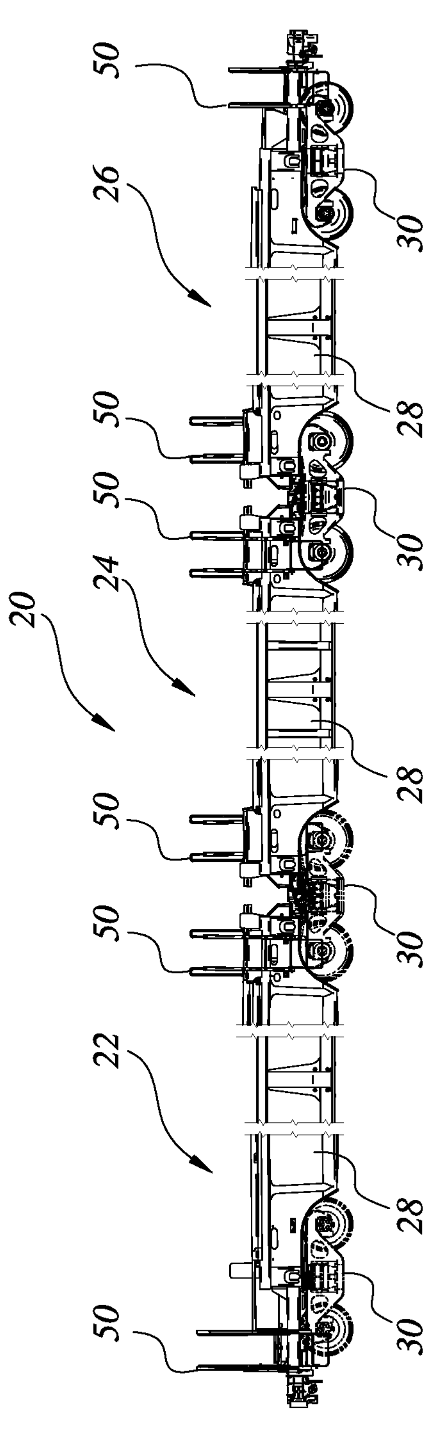
FIG. 1*b* is a side view of the railroad well car of FIG. 1*a;*

FIGS. 1*a* and 1*b* show a top view and a side elevation view of an example of a railroad freight car 20 intended to be representative of a range of railroad freight cars, such as may include well cars, flat cars or spine cars in which the apparatus described herein may be incorporated. Freight car 20 may be a single unit car, or may be a multiple unit articulated car having multiple body units 22, 24, and 26 (or more) joined together at substantially permanent fitting such as shared trucks or draw-bars. Car 20 as shown may be a well car such as may typically be used for the transport of intermodal shipping containers. Car 20 may have a car body 28 that is carried on trucks 30 for rolling operation along railroad tracks. Car body 28 may have first and second end sections. Each end section is supported by a respective truck 30.

Various embodiments herein reduce the height of the ladder assemblies by making a ladder assembly that can slide or slide and pivot from a reduced-height stowed position to a full-height deployed position. This allows the ladder stile to be protected during loading and unloading of the railcar, yet to be easily deployed when the operator needs access to the car and the deployed height will meet the AAR standards. The operator lifts and slides the ladder style into the deployed position. To stow the ladder stile, the operator releases the lock, lifts and slides down the ladder stile to the retracted or storage position.

In a first embodiment there is a trackside access fitting assembly, or ladder assembly, 50, as shown in FIGS. 2*a*, 2*b*, 2*c*, and 2*d*. Ladder assembly 50 has a datum portion or stationary portion 52 that is mounted to body structure of the associated railcar, or railcar unit; and first and second movable portions indicated as left hand movable portion 54 and right hand movable portion 56. In this embodiment, and in the embodiments that follow, the "stationary portion" refers to that portion of the assembly that is rigidly mounted relative to the railcar body, and that is therefore stationary relative to that body. The railcar body is thereby understood to be the datum, or frame of reference, for the description of the trackside access assembly. In context, the car is usually assumed to be stationary, yet there may be occasions when the car is moving slowly, and yard personnel may be riding on the lowermost step.

Stationary portion 52 may include left hand and right hand uprights, or posts, or stanchions 58, 60 that may have the form of angles or channels, or hollow steel tube. Left hand and right hand mounting brackets 62, 64 may extend from lower portions of stanchions 58, 60, and may be fastened to the railcar body structure by such means as welding or mechanical fasteners, such as Huck™ bolts.

Stationary portion 52 may have a lowermost or first step 66 which may be formed of a U-shaped formed piece of steel bar having upper ends fastened to the lower ends of stanchions 58, 60. Stationary portion 52 may also have additional cross-pieces or rungs, such as second rung 68 and third rung 70 that are spaced apart upwardly of first step 66.

Stationary portion 52 may include receptacles, guide fittings, or sockets, or holders, or fittings 72, 74 mounted to lower portions of stanchions 58, 60. Fittings 72, 74 may have a first seat or first portion 76 and a second seat or second portion 78, the first seat or portion 76 permitting motion of the associated movable portion 54, 56, as may be; and the second seat or portion 78 that constrains motion of the respective movable portion. In the example illustrated, the first portion is a hollow sleeve that permits axial passage of portion 54 or 56; and second portion 78 may have the form of a blind-ended socket the prevents motion of movable portion 54 or 56 when engaged therein.

Movable portion 54 and movable portion 56 may have a first member in the form of a shaft, or rail, or post 80 that terminates in a stop 82, which may have the form of a bent rod. Movable portion 54 or 56 may have a connection 84 mounted to the upper end of the respective stanchion 58, 60. Connection 84 may have the form of a pivotally mounted sleeve 86, the sleeve allowing axial motion of post 80. Post 80 has a lower end 88. Movable portion 54, or 56 also has a retainer or stop 90 mounted along a lower portion of post 80, such that post 80 is captured in sleeve 86. That is, neither stop 82 nor retainer 90 can pass through sleeve 86. Thus, while movable portion 54 or 56 has a range of axial travel relative to sleeve 86, that range is bounded by stop 82 and retainer 90.

Figure 2B:
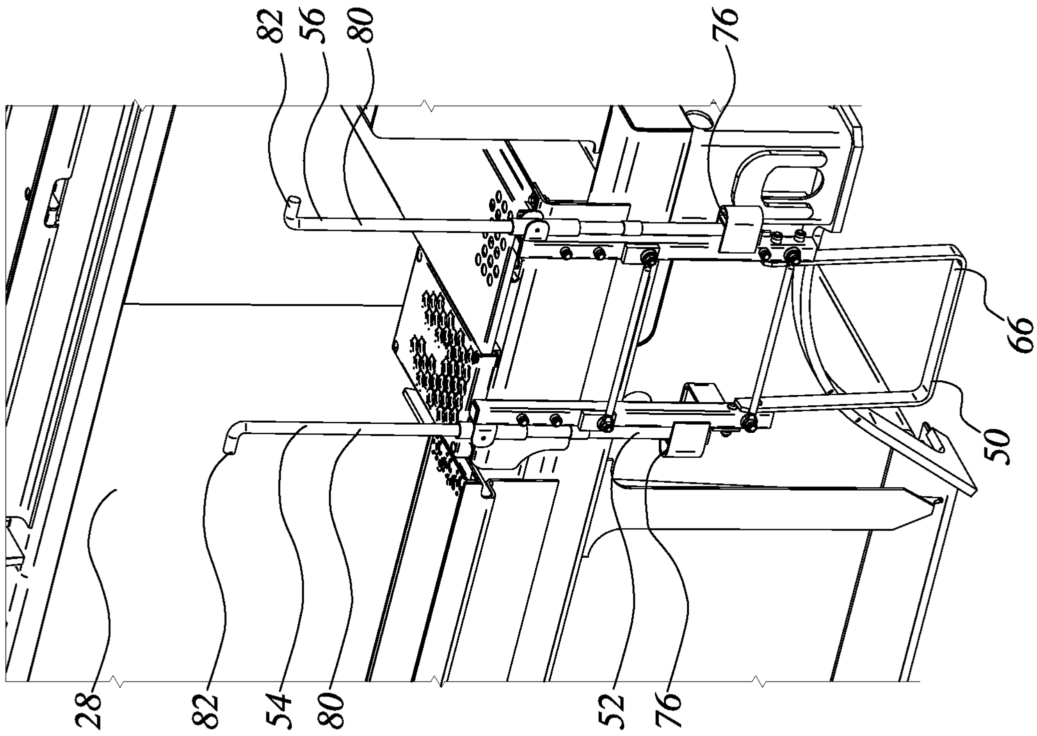
FIG. 2*b* is an isometric view of the access fitting assembly of FIG. 2*a* in a deployed position.
Figure 2A:
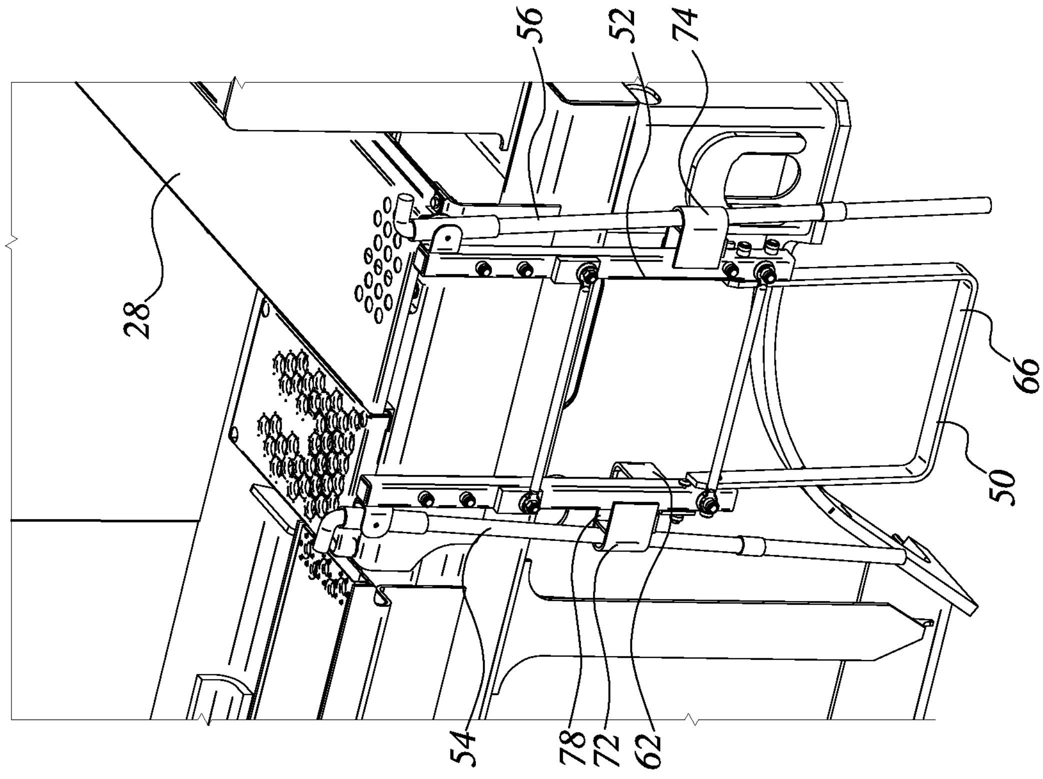
FIG. 2*a* is an isometric view of an access fitting assembly for the railroad well car of FIG. 1*a*; in a retracted position.
Figure 2D:
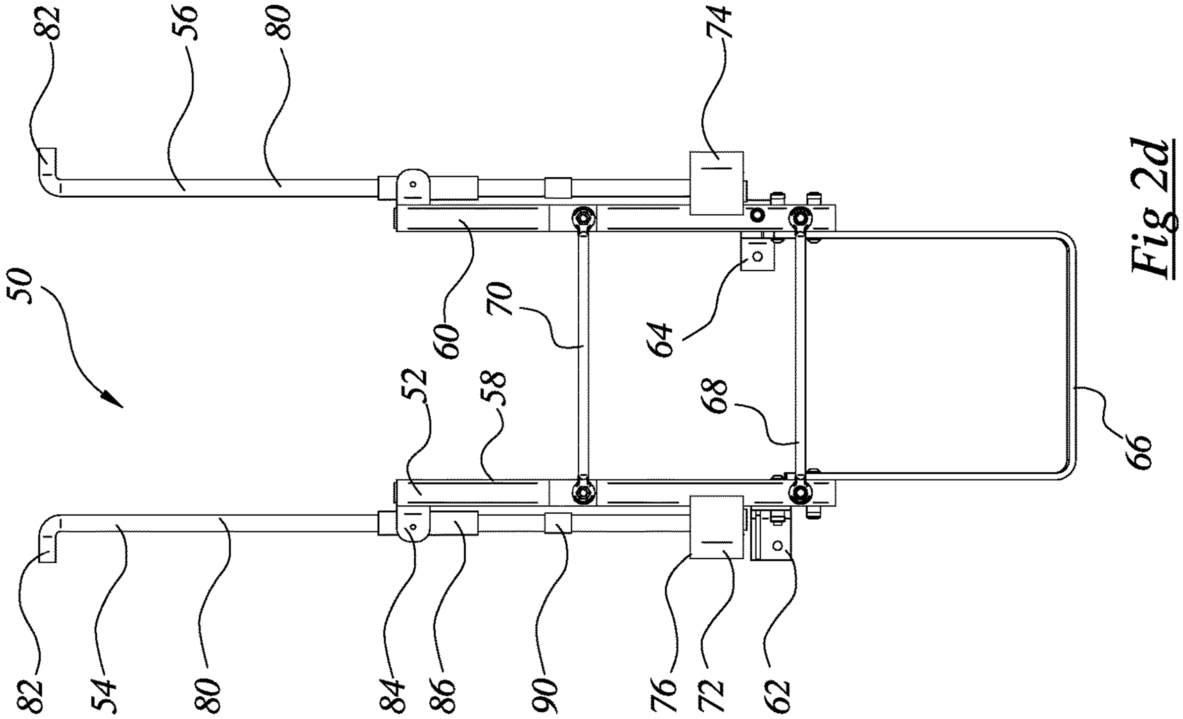
FIG. 2*d* is a front view of the access fitting assembly of FIG. 2*b;*
Figure 2C:
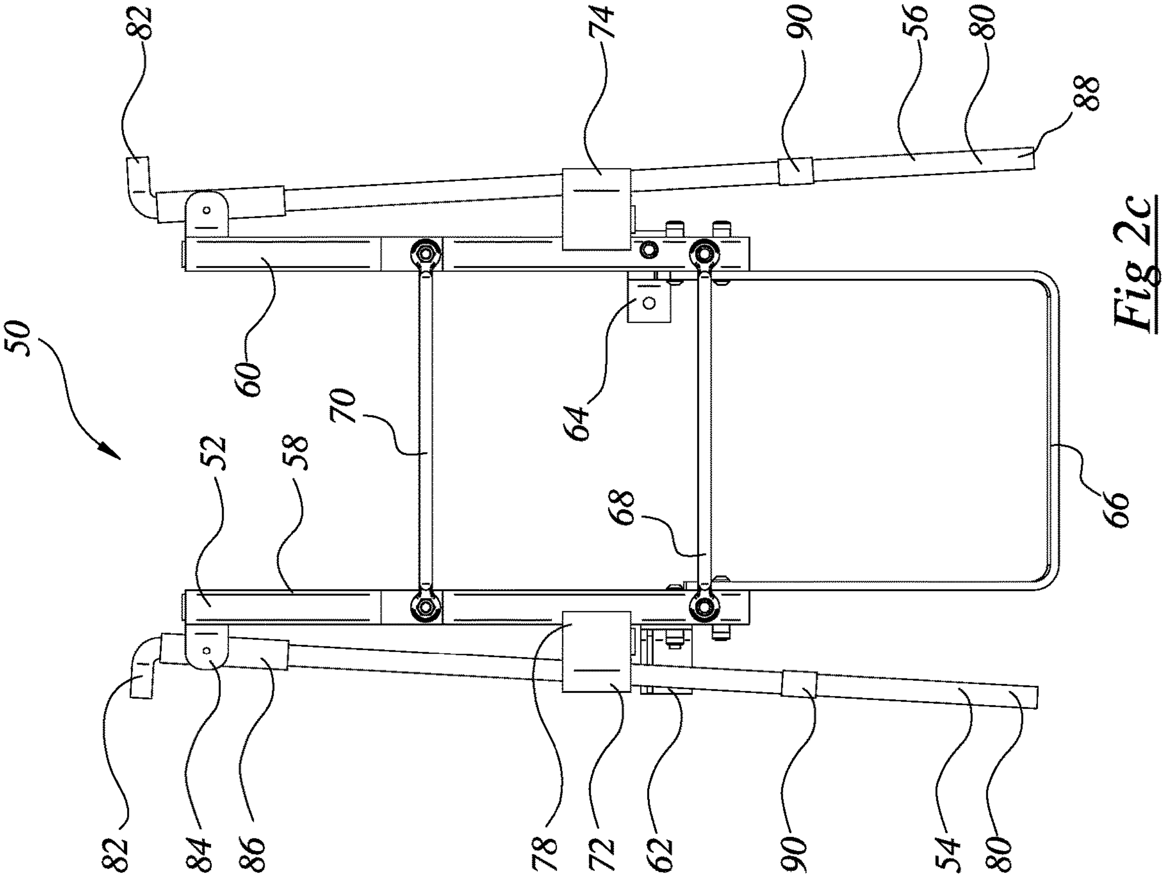
FIG. 2*c* is a front view of the access fitting assembly of FIG. 2*a;*

In operation, the apparatus starts at a first position, which may be designated the retracted or stowed position, as shown in FIGS. 2*a* and 2*c*. In this position, post 80 is at its lowermost position, with stop 82 engaging the upper end of sleeve 86, and thereby preventing movable portion 54 (or 56) from falling out of pivoting sleeve 86. Sleeve 86 is pivoted slightly to an angled position in which the shaft of rod or post 80 is oriented slightly off vertical to pass through the sleeve defined by first portion 76 of fitting 72 (or 74, as may be). The sleeve of first portion 76 is large enough to admit passage of retainer 90.

When personnel at trackside wish to mount car 20, they can raise post 80 to pass lower end 88 up through first portion 76. When lower end 88 is lifted clear of first portion 76, the pivotal mounting of connection 84 allows end 88 to be shifted laterally inboard into the socket defined by second portion 78. End 88 seats in that socket, and is retained there by its own weight. When both fittings, or movable portions or handholds, or stiles, 54, and 56 are thus placed, the trackside personnel may climb up ladder 50, using posts 80 as hand holds while stepping onto the decking or walkway of car 20 more generally. Retainers 90 prevent posts 80 from being raised out of sleeves 86, and perhaps discarded or lost. The second, or raised, or deployed condition or position of movable portions 54 and 56 is shown in FIGS. 2*b* and 2*d*. Once the personnel have dismounted, the process may be reversed, with ends 88 being disengaged from the sockets of fittings 78, and posts 80 being slid down through the sleeves defined by first fittings 76, and back to the first position.

In summary, in FIGS. 2*a* and 2*b*, the handhold, post 80, slides and pivots from a stowed to a deployed position, FIG. 2*b*. The permanent stanchion that is attached to the car has a pivot connection close to the top of the structure and a holder closer to the bottom of the structure. There are two holder designs. The first holder, FIGS. 2*a* and 2*b*, consists of two "pockets" the inner "pocket" is for the deployed position and the outer "pocket" is for the stowed position. The inner pocket has a base to maintain the required height of the handhold and provide stability for the handhold for the operator to access the car. The outer pocket does not have a base and is used to prevent the handhold from moving out of the stowed position.

Figure 3C:
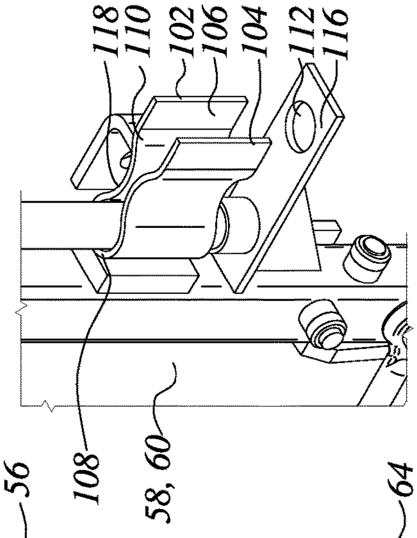
FIG. 3*c* is an enlarged detail of the access fitting of FIG. 3*b;*
Figure 3B:
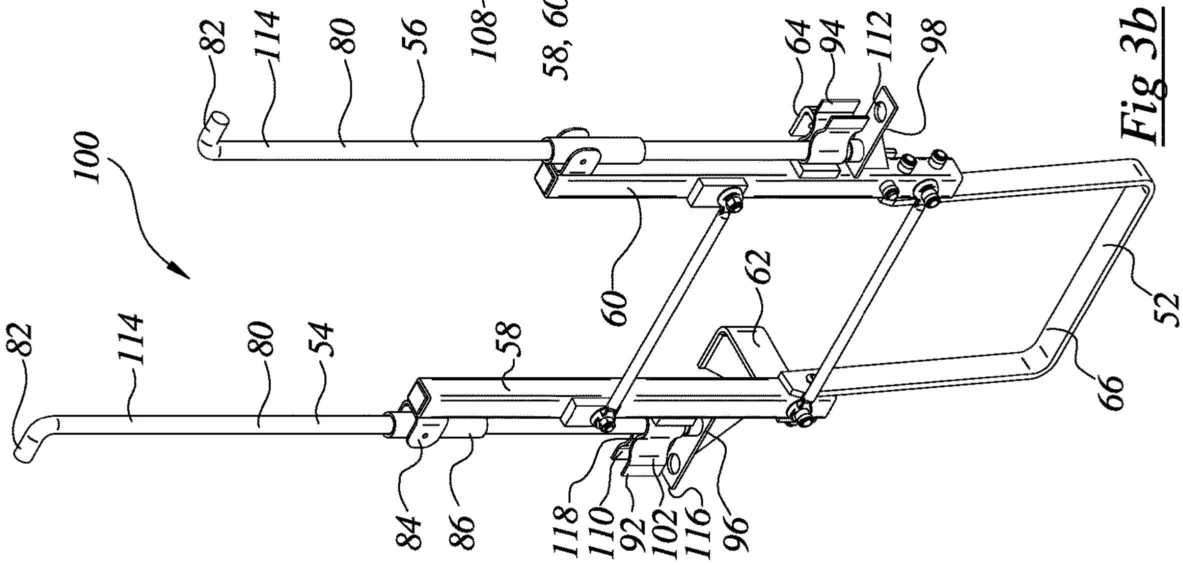
FIG. 3*b* is an isometric view of the access fitting assembly of FIG. 3*a* in a deployed position.
Figure 3A:
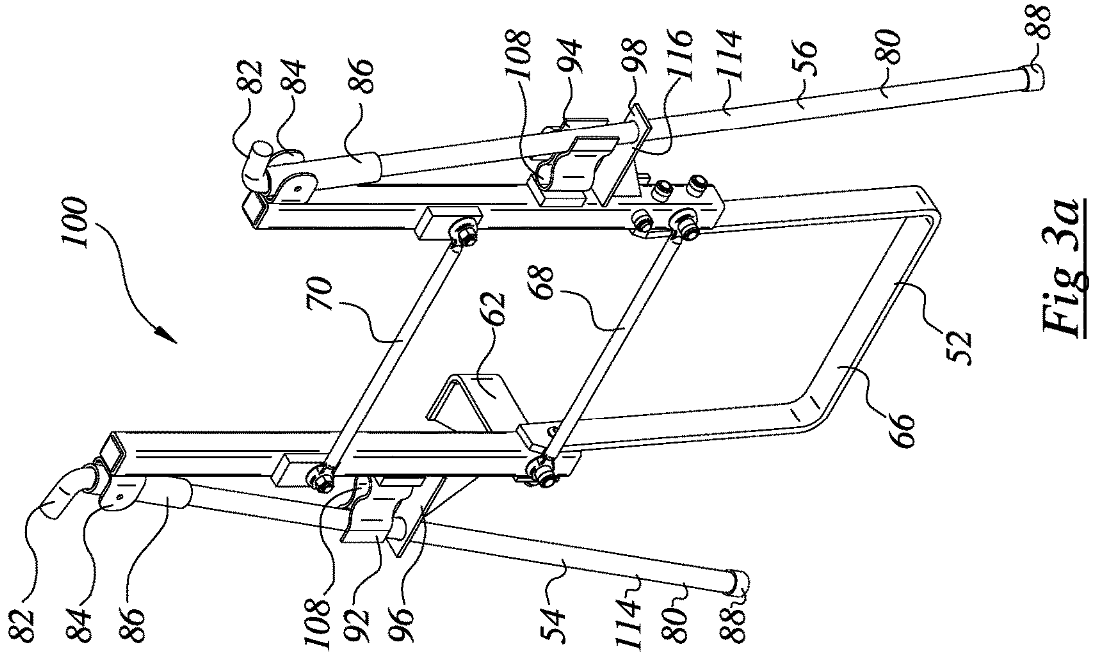
FIG. 3*a* is an isometric view of an access fitting assembly for the railroad well car of FIG. 1*a*; in a retracted position.

The embodiment of trackside access assembly 100 of FIGS. 3*a*, 3*b*, and 3*c* is substantially similar to that of FIGS. 2*a* and 2*b*, but rather than employing holder fittings 72 and 74, access assembly 100 employs holder fittings 92, 94 and brackets 96, 98. In this instance, each fitting 92, 94 has a resilient member, or biased member, or spring in the form of a spring clip or spring holder 102. Spring holder 102 has a back or innermost portion that is fixedly mounted to the associated stanchion, be it 58 or 60, and a pair of spaced apart legs 104, 106 that extend away from the respective stanchion. Legs 104, 106 are formed to define first and second accommodations, or lodgements, or seats 108, 110. As suggested by the name, spring holder 102 is a U-shaped spring. Lodgements 108 and 110 each admit the diameter or thickness of post 80. Consequently, when post 80 occupies either of the lodgements, legs 104, 106 are biased toward each other and may discourage post 80 from being dislodged. Whether lodgements 108, 110 have an interference fit or a loose fit, the neck 118 between lodgements 108, 110 is narrower still, such that moving post 80 from one to the other requires the legs to be deflected, which, since holder 102 is a spring, they resist. In effect, it functions as a detent resisting motion between the two states or lodgements.

Angle brackets 96, 98 are mounted to the outside of stanchions 58, 60 below holder fittings 92, 94. The distal or outermost portion of the horizontal leg of bracket 96 (or 98) has an opening, or accommodation 112 formed therein that admits passage of the lower portion of post 80, and retainer 90, to pass therethrough, from the second or raised or deployed position of FIG. 3*b* to the to the first or lowered, or retracted, or storage positions of FIG. 3*a*. In the raised position, the inner, or proximal portion of the upper surface of the laterally horizontally extending leg 116 of bracket 96 (or 98) acts as an abutment or stop preventing downward movement of the handhold 114.

In summary, the holder of FIGS. 3*a* and 3*b* has a spring of a type that is opened, or spread, by pushing the lower end 88 of post 80 of handhold 114 in the lateral direction to allow it stay in the deployed position (or in the retracted position, as may be). For movement to the stowed position, the handhold is pulled in the lateral direction out from the spring, and pushed down into the opening or hole 112 of the support bracket.

Handhold 114, of which post 80 may be a pipe or rod can be slid upwards out of the outer pocket and the freedom of motion provided by the pivot allows it to be moved into the inner pocket of the holder. There is a stop (a ring, or nub, etc.) to prevent the handhold from unintentionally (or, indeed, intentionally) being removed or lifted higher than the needed height to disengage from the deployment position, FIG. 3*b*. To stow handhold 114 the operator will lift handhold 114 up to remove it from the inner pocket or lodgement of holder 102 and pivot to place handhold 114 in the laterally outer pocket. The bend or cap or top of handhold 114 (rod/pipe) acts as a stop for the handhold to prevent it from sliding through the pivot, as before, and as shown in FIG. 3*a*.

Figure 4A:
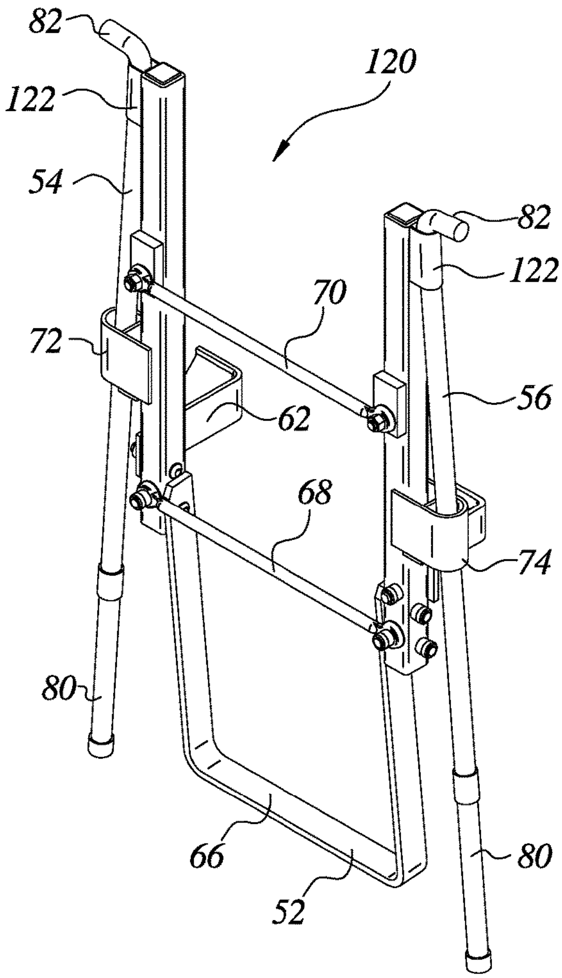
FIG. 4*a* is an isometric view of an access fitting assembly for the railroad well car of FIG. 1*a*; in a retracted position.
Figure 4B:
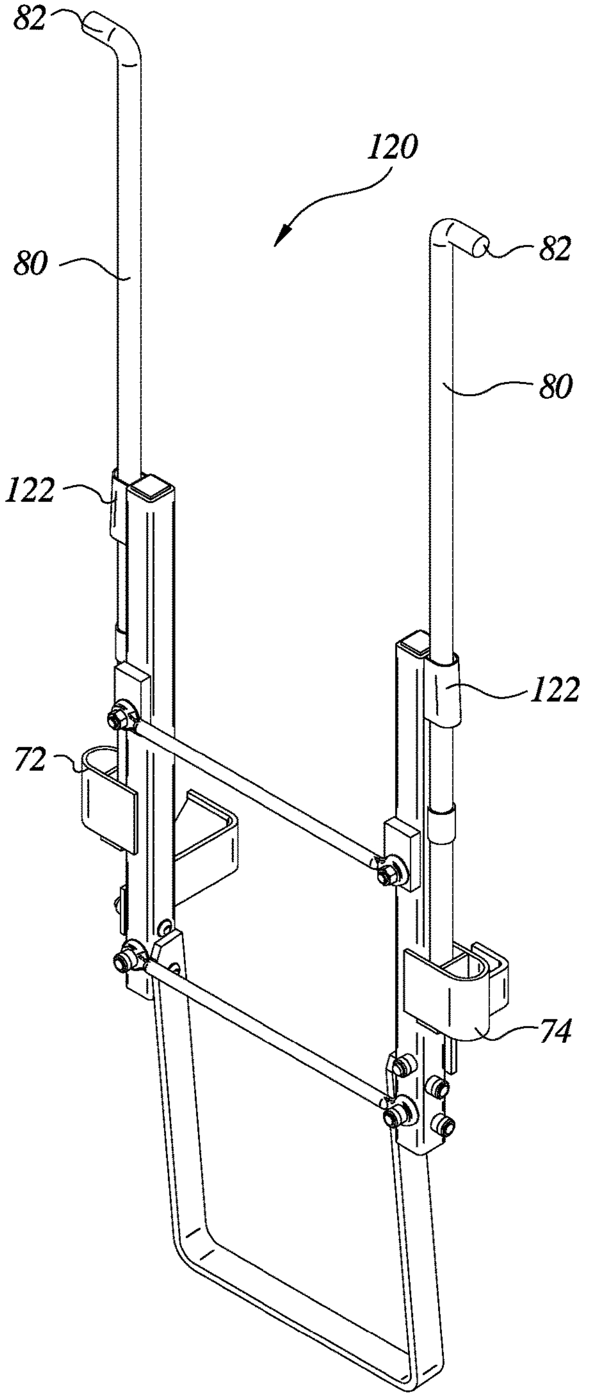
FIG. 4*b* is an isometric view of the access fitting assembly of FIG. 4*a* in a deployed position.
Figure 5A:
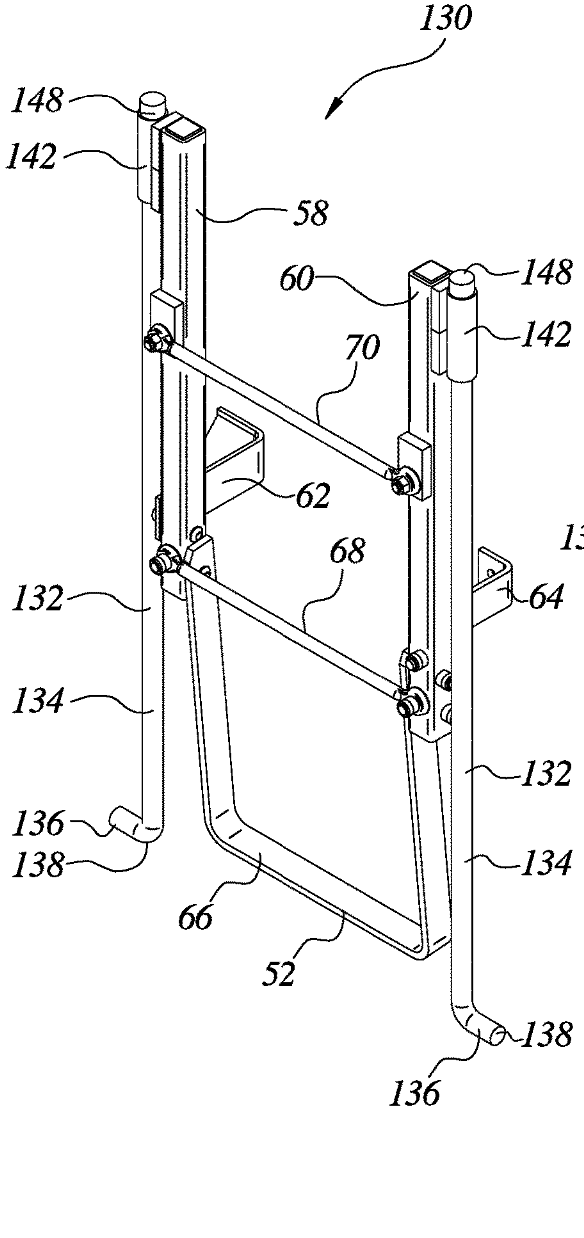
FIG. 5*a* is an isometric view of an access fitting assembly for the railroad well car of FIG. 1*a*; in a retracted position.
Figure 5B:
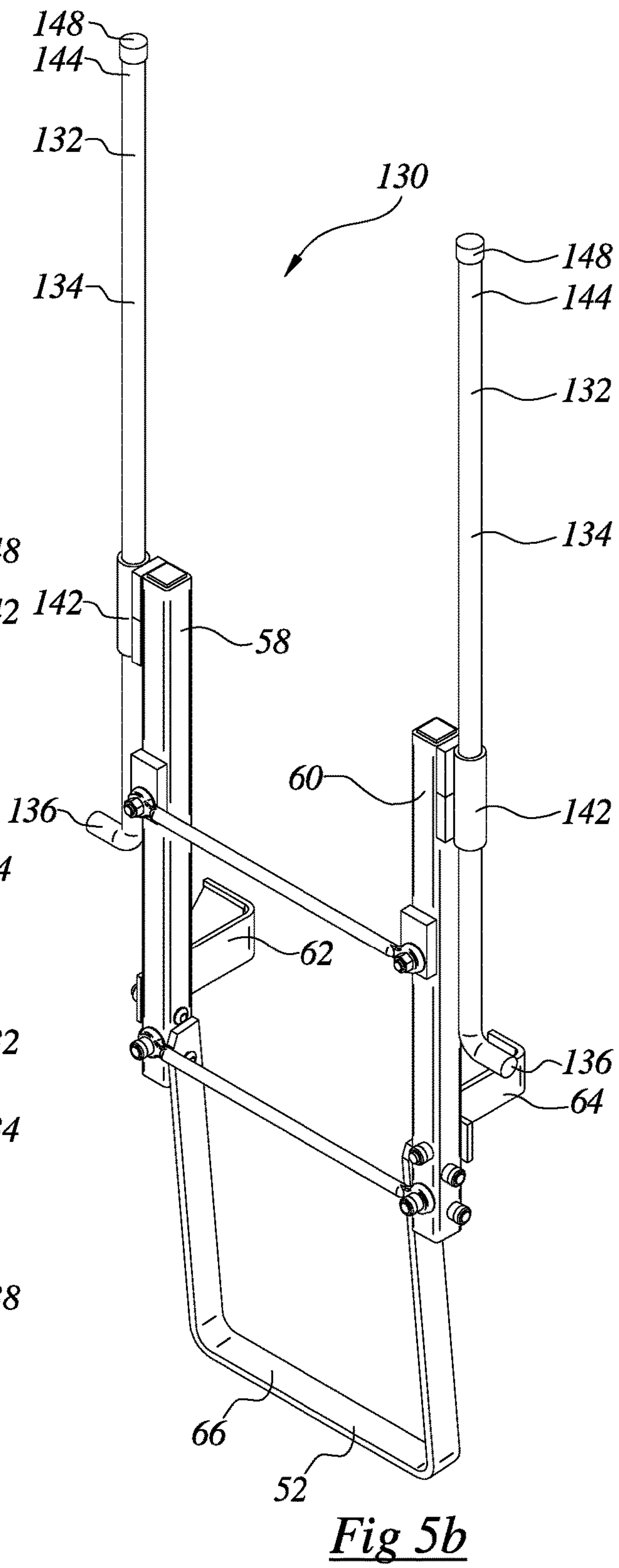
FIG. 5*b* is an isometric view of the access fitting assembly of FIG. 5*a* in a deployed position.
Figure 5C:
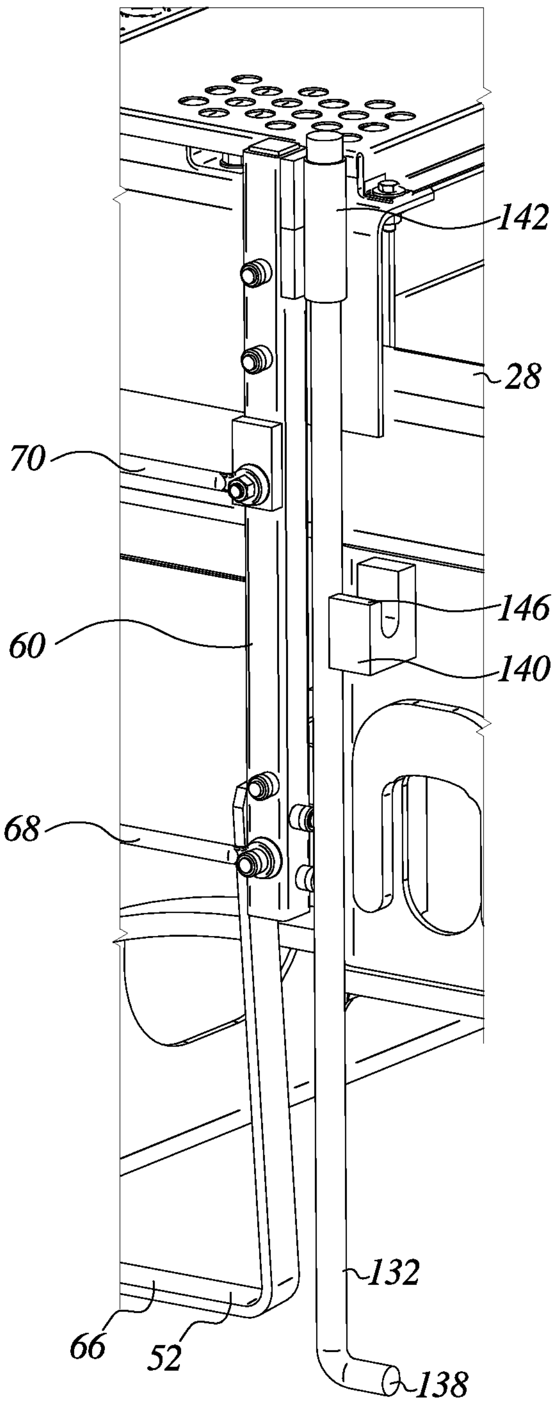
FIG. 5*c* is a perspective view of a detail of the access fitting assembly for the railroad well car of FIG. 5*a*; in a retracted position.
Figure 5D:
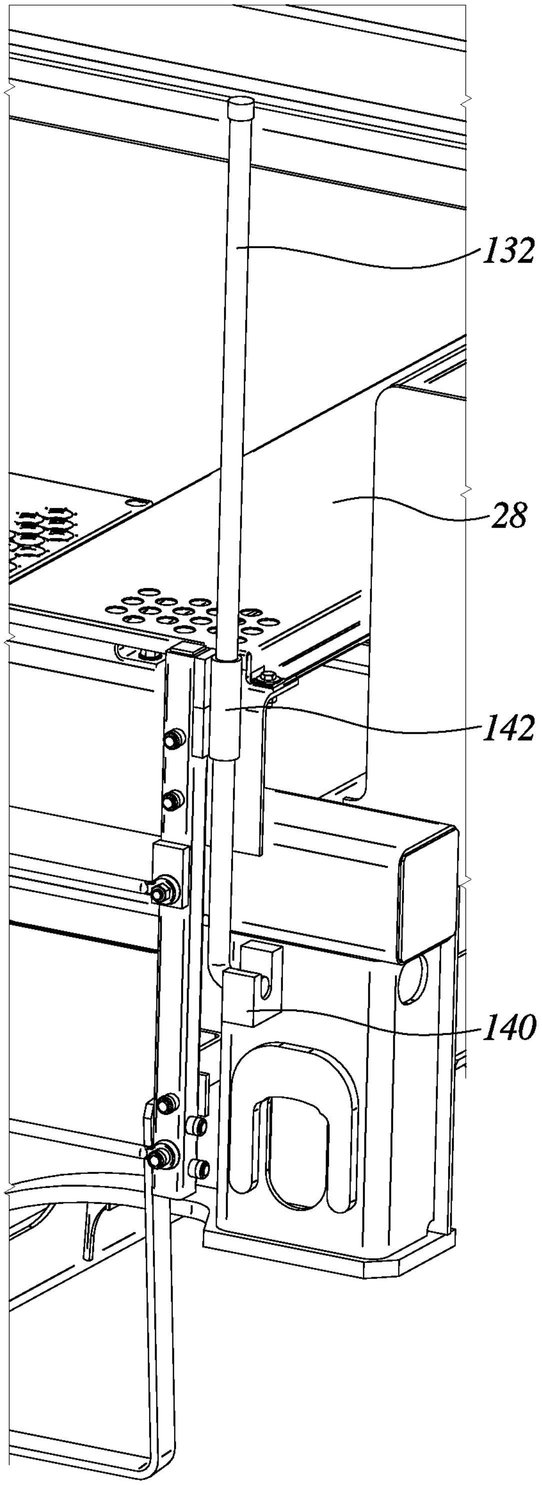
FIG. 5*d* is a perspective view of the detail of FIG. 5*c* in a deployed position.

The embodiment of trackside deck access assembly 120 of FIGS. 4*a* and 4*b* is similar to the previous one except that upper connection 122 does not have a pivot and just had a bracket at the top of the stanchion. Upper connection 122 is a conical or cylindrical slide or sleeve having enough play in it to allow rotation and to permit handhold 114 to move from the guide portion of the holder to the fixed portion of the holder, whether the holder is holder fitting 72, 74 or holder fitting 92, 94. This no-pivot at the top may tend to facilitate manufacture and operation, and may tend to make it less affected by cold weather and less expensive as shown in FIGS. 4*a* and 4*b*.

In the embodiment of FIGS. 5*a*, 5*b*, 5*c* and 5*d*, there is a trackside accessible deck access assembly, or ladder assembly 130. It is substantially the same as the previously described embodiments in respect of the stationary portion 52. However, it differs by effectively inverting the handhold. In this instance, handhold 132 has a first or main portion in the form of a shaft or rod or post 134 that has an indexing member or stop 136 formed at the bottom end. The indexing member or stop may have the form of a bent or angled end of the rod, as at 138. Holders, in the form of a mating left hand and right hand abutments, or catches, 140 are mounted to the body structure of car 20, (or, alternatively, to the stationary structure of stanchions 58, 60). Catches 140 include an accommodation in the form of a notch or slot in which to receive bent end 138. The upper connection 142 is a sleeve fixedly mounted to the top end of the outside of the respective stanchion. The upper end 144 of post 134 has a cap or stop 148 that is oversized to prevent its passage through slide or sleeve 142.

In FIGS. 5*a*, 5*b*, 5*c* and 5*d*, vertical handhold 132, such as may be manufactured from a rod or pipe, is positioned in sleeve 142. Sleeve 142 is cylindrical and allows a single degree of freedom of motion of rod or pipe 134 to move in vertical translation, as well as allowing rotation of rod or pipe 134 about its vertical axis. Handhold 132 is moved up from the stowed position to be higher than holder 140, and handhold 132 is turned to place bent end 138 to point along the car such that it can be lowered to sit in the receiving accommodation of holder 140. Holder 140 restricts disengagement of handhold by having the opening at the top of the holder with a lip 146. That is, the laterally outboard leg or side of the notch in holder 140 has a lip 146 that partially overhangs the bottom of the notch, thereby tending to discourage dislodgement. The handhold will be moved up to disengage from the holder with a little lateral movement. The handhold is to be rotated and lowered to the stowed position, FIG. 5*a*. As before, oversized cap or stop 148 at the top prevents handhold 132 from falling out of sleeve 142 and prevents water infiltration if a pipe is used. The bent bottom end 138 of handhold 132 will be "L" shaped. A grip portion is used to move the handhold up and down, and to function as and part of the locking mechanism. Shaped bracket, or catch, 140 is welded to the car body for the purpose of locking handhold 132 in the deployed position. A similar bracket may be used to lock the handhold in the stowed position as well, or it may hang as shown.

Figure 6A:
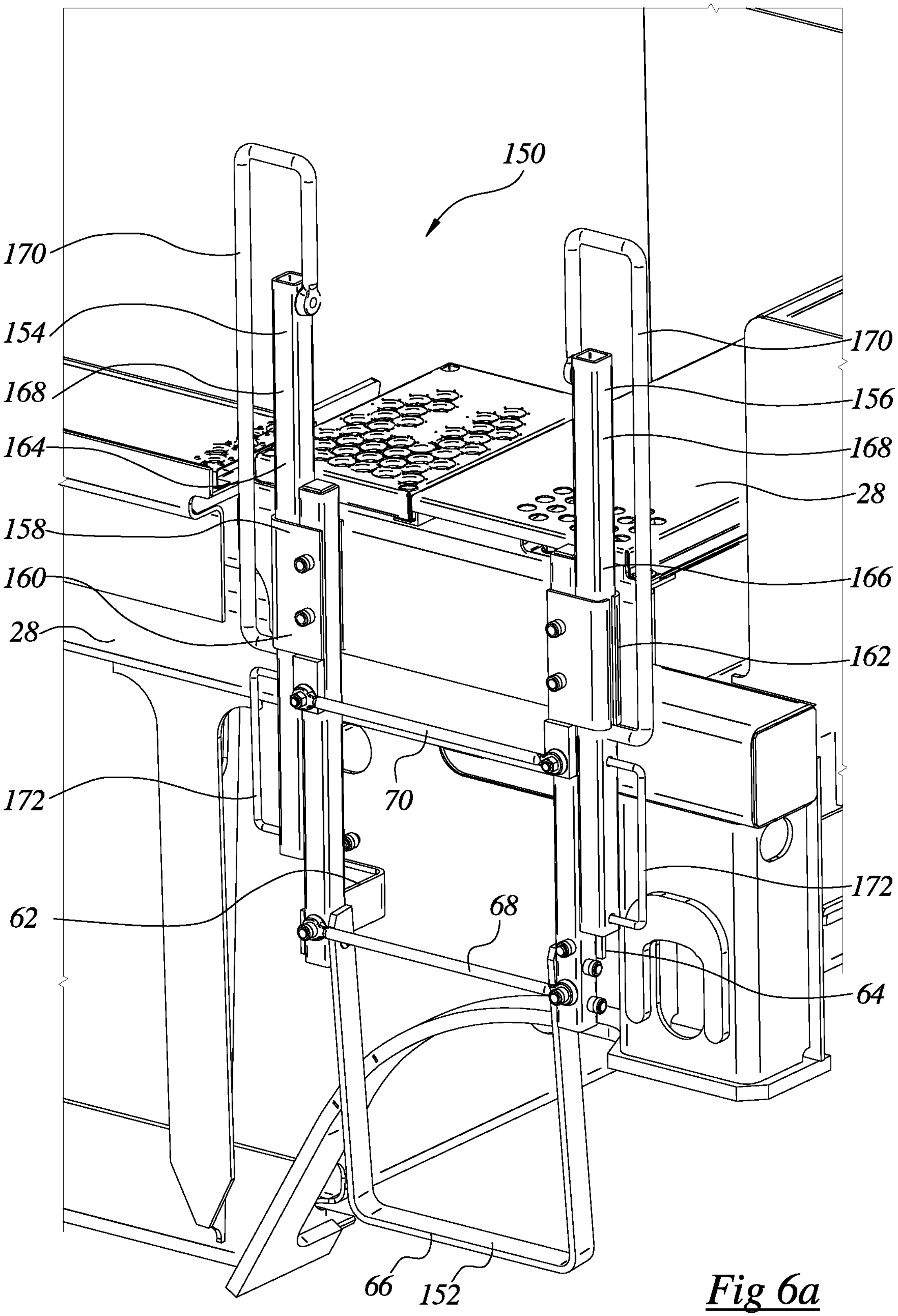
FIG. 6*a* is an isometric view of an access fitting assembly for the railroad well car of FIG. 1*a*; in a retracted position.

In the embodiment of FIG. 6*a*, a trackside accessible deck access assembly, or ladder assembly 150 includes a stationary portion 152 and first and second or left hand and right hand movable portions 154, 156. The stationary portion 152 is substantially the same as the stationary portions described above. They differ in having a two-part sleeve guide 158 that includes a front portion and a rear portion in the form of L-shaped guide brackets 160, 162. The brackets mount to the front and rear of stanchions 164, 166 respectively.

Movable portions 154, 156 each have a movable stile or tube 168, which may be of square section, and which slides vertically between brackets 162, 164. A handgrab or handhold 170 is mounted to each movable portion the handgrab having a short inner vertical portion, a top horizontal portion, and a longer outer vertical portion that extends down the outside of, and generally parallel to, tube 168. The bottom end of the outer leg is bent back toward, and is joined to, tube 168. A retractable handle 172 is mounted to the lowermost portion of tube 168. Retractable handle 172 is spring loaded. Each of stanchions 164, 166 has apertures drilled therein to receive the spring-loaded toe of handle 172. There is a lower hole and an upper hole. The lower hole corresponds to the retracted position of handgrab 170, and the upper hole corresponds to the deployed position. The clearance between the edges of brackets 162, 164 permits the passage of the lower connection of handgrab 170 therebetween as tube 168 moves within the guideway.

Figure 6B:
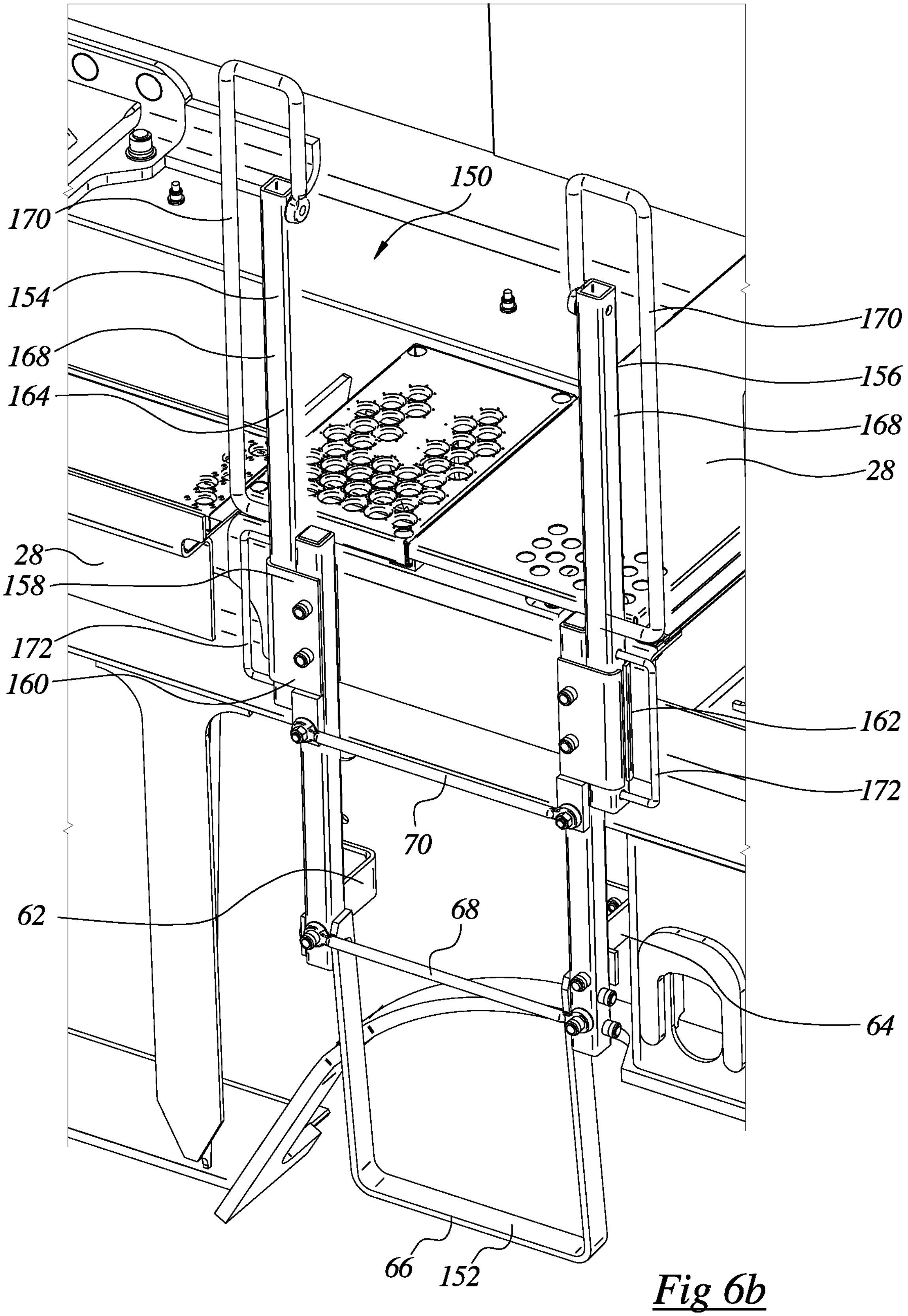
FIG. 6*b* is an isometric view of the access fitting assembly of FIG. 6*a* in a deployed position.
Figure 7A:
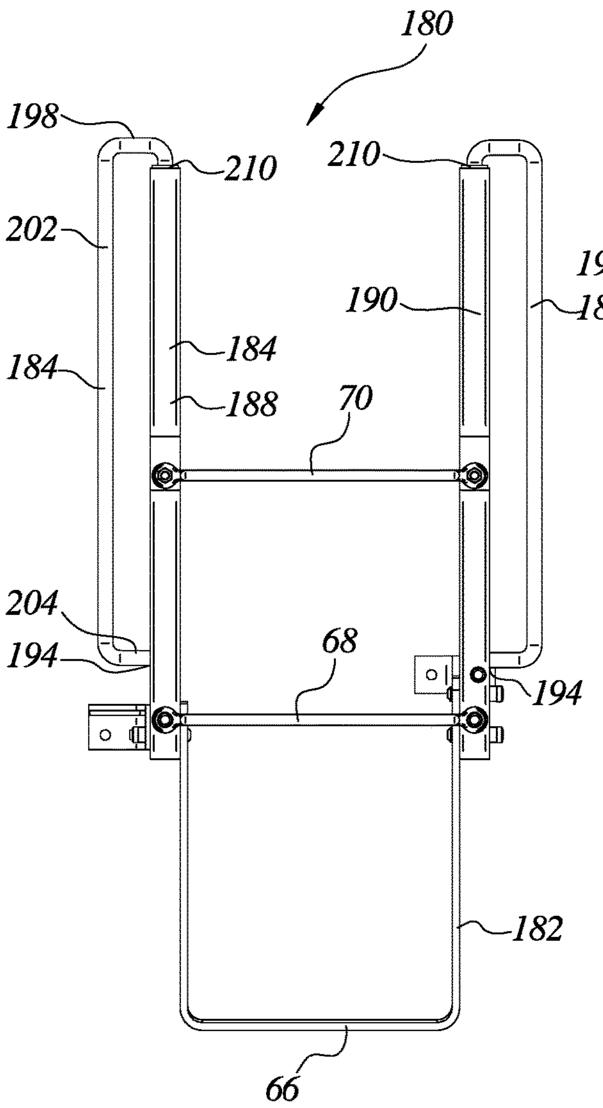
FIG. 7*a* is a perspective view of an alternate embodiment of access fitting assembly for the railroad well car of FIG. 1*a* in a retracted position.
Figure 7B:
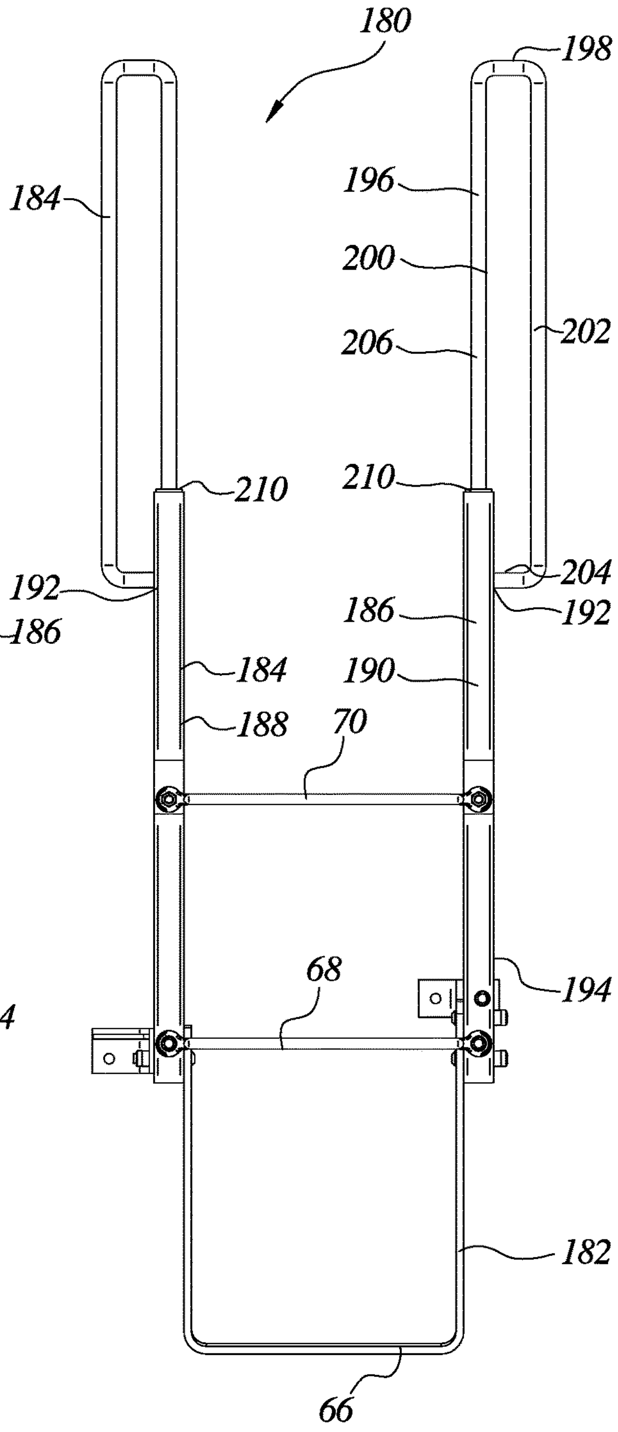
FIG. 7*b* is a perspective view of the assembly of FIG. 7*a* in a deployed position.
Figure 7C:
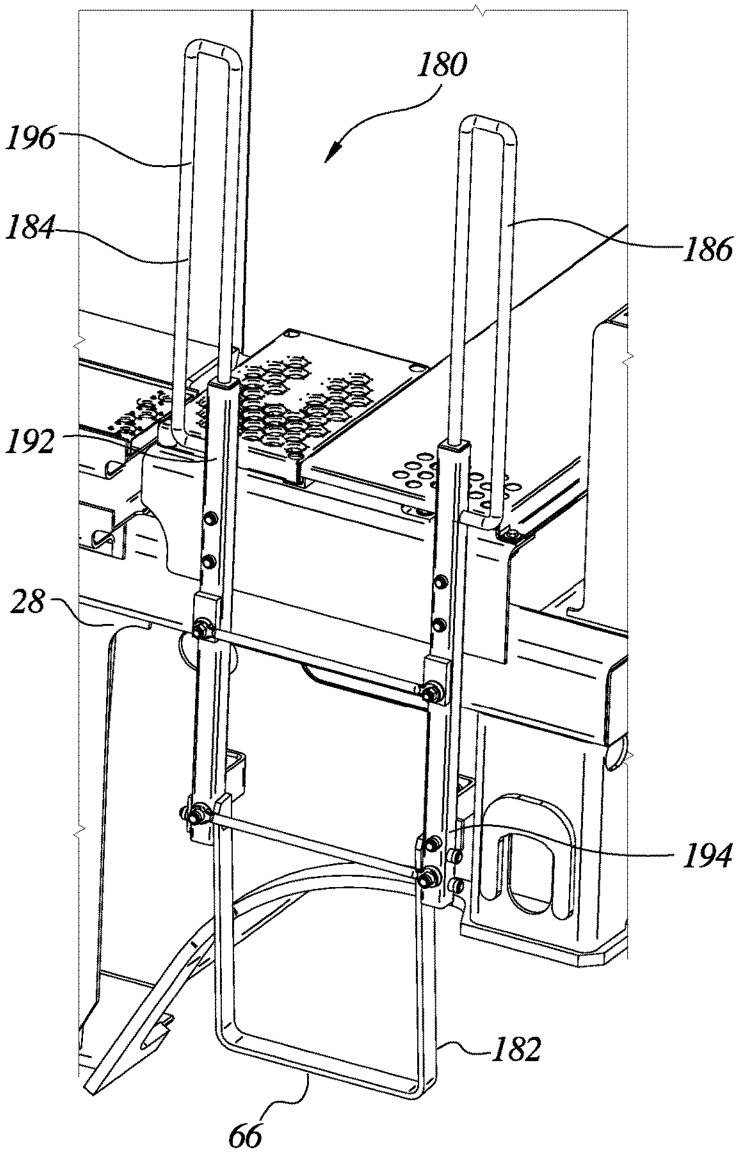
FIG. 7*c* is a perspective view of the access fitting of FIG. 7*a* as mounted to the railroad car.
Figure 7D:
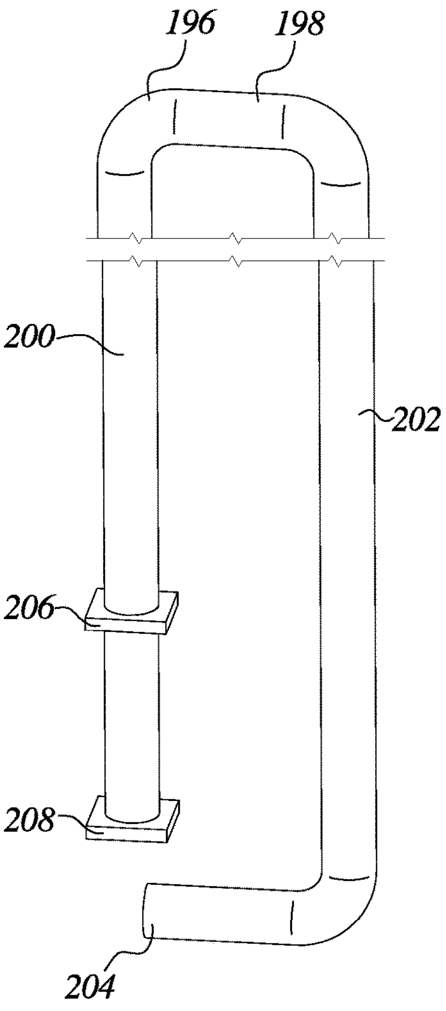
FIG. 7*d* is a an enlarged detail of the handhold of the access fitting perspective view of the access fitting assembly of FIG. 7*a* in a deployed position.

In summary, ladder assembly 150 has first and second, left hand and right hand upper slidable assemblies, namely movable portions 154, 156 (movable stile) and a lower fixed assembly (fixed stile), or stationary portion 152. The fixed stile consists of a rectangular HSS tube that is capped at the top, and open at the bottom. The fixed stile is connected to the car body by fasteners such as Huck™ bolts or by welding. The movable stile also has a rectangular HSS tube, as well as a vertical handhold bar, as seen in FIGS. 6*a* and 6*b*. At the lower part of the movable stile retractable spring-and-pin loaded handle 172 is used to lock the movable stile in a stowed or deployed position. The retractable spring-and-pin handle has two legs. One of them is loaded with springs inside the HSS of the movable stile. The movable stile is guided by sleeve guide 160 which is bolted to the fixed stile. The sleeve guide is bolted to the fixed assembly to guide the movement of the upper assembly between the stowed and deployed positions.

To deploy the movable stile the operator disengages the spring-and-pin handle by pulling it laterally outward and sliding it upward. As it rides upwardly along stationary portion 152, the spring-loaded pin is ready to extend into the next opening at the first opportunity. When the handle leg reaches the upper hole in the HSS of the fixed stile, the spring loaded pin moves into engagement, thus engaging the handle for the second or deployed position. To retract the apparatus, the operator pulls the handle laterally outward to disengage from the upper hole in the deployed position, and slides the handle down the upper assembly back to the lower hole at the first or stowed position.

In the embodiment of FIGS. 7*a*, 7*b*, 7*c* and 7*d*, a trackside accessible deck access assembly, or ladder assembly 180 has a stationary portion 182 and first and second, or left hand and right hand, movable portions 184, 186. Stationary portion 182 is substantially the same as stationary portions 52, and so on, described above. However, the left hand and right hand stanchions 188, 190 of stationary portion 182 have indexing fittings, such as may be in the nature of upper and lower engagement sockets or holes 192, 194. A handhold or handgrab 196, which may be made from a bent rod or pipe, or assembly of pipe components, has the general shape of a trombone slide, there being an inner or main leg 200, an outer or depending leg 202, an upper cross piece 198, and a lower lateral return piece, or post engagement member 204, which may typically be the stub end of the pipe or rod, a tip, or pin, or spring loaded pin, and so on. In this regard, the depending leg itself may be considered a spring in bending flexure. The inward tip or point of the pin, or engagement member, 204 engages, or mates with, one or the other of upper socket 192 or lower socket 194. The general structure of handgrab 196 is sufficiently flexible to function as a stiff spring, such that the operator can disengage member 204 from the sockets in such manner as may suit. Main leg 200 of handgrab 196 has internal bottom and intermediate guides 206, 208, as shown in the cut-away view of FIG. 7*b*. Guides 206 and 208 have profiles that correspond to the square or rectangular internal profile of hollow stanchions 188, 190, that limit non-axial motion of main leg 200 while permitting axial translation within the slide. Bottom guide 206 also functions as a bottom stop limiting motion of main leg 200 downward when ladder assembly 180 is in the retracted or lowered position. A further top cap guide 210 is fixedly mounted to the top end of each stanchion 188, 190, and has a central guide aperture sized to permit sliding motion, i.e., vertical axial translation, of main leg 200. Intermediate guide 208 cannot pass cap guide 210, and accordingly their engagement determines an upper terminal limit on motion of leg 200, and therefore of handgrab 196 more generally. The spacing between guides 206 and 208 defines a moment arm that, in common with any spacing below guide 210, tends to keep leg 200 axially true.

In summary, ladder assembly 180 has a fixed stile connected to car body 20 as well as a moveable handhold, handgrab 196, that runs inside the fixed stile. Handhold 196 has two connections to the stile. The top handhold connection includes a translational joint permitting vertical translation between handhold 196 and the stationary ladder stile, be it stanchion 188 or stanchion 190, thereby allowing vertical motion of the handhold inside the stile. The bottom connection point of the handhold includes, or is defined by, the releasable or removable engagement of the pin or spring module securing the lower end pin or engagement member 204 of depending leg 202 of handhold 196 in the respective low and high handhold positions by locking the pin inside the upper and lower holes or sockets 192, 194 allocated at the bottom and top of stanchions 188, 190 of the fixed stile. For example, to switch from the low position or condition to the high position or condition, pin 204 at the low handhold position, is released first from lower socket or hole 194. Then, handhold 196 is moved upward until the bottom portion of handhold 196 (i.e., pin 204) reaches the high pin hole 192. Handhold 196 is then locked when pin 204 seats inside high pin hole 192. A reverse process can be performed to switch from high to low position. Handhold 196 has rectangular-shaped plates, or guides, 206, 208 welded at the bottom of the part that is inside the HSS. These plates tend to prevent the handhold from rotating and co-operate with the HSS as a guide for handhold 196. Two plates may be used in the lower portion of the handle, as shown and described, to give more rigidity to the handle. The pin joint or spring joint connection can be secured by applying a secondary positive locking mechanism. In an alternate embodiment, there may be no bottom pin or spring socket and the handhold is not engaged in the hole. The stowed position is when the handle rests at the top of the HSS seals plate, i.e., when lower or bottom guide 206 reaches the end of travel limit at the obstructed bottom end of the HSS tube. In a further alternate embodiment, a holder such as notched holder or catch 140 could be welded or otherwise fixedly attached to the outside of each stanchion 188, 190, and in the deployed position the bent in bottom end engagement member 204 rests at the support U-plate (i.e., item 140) welded to the HSS. In a further alternate embodiment, both spring or pin sockets in the HSS could be omitted, using the bottoming of plate or guide 206 to determine retracted end of travel; and using a member such as catch 140 to determine the upper end of travel location.

Figure 8D:
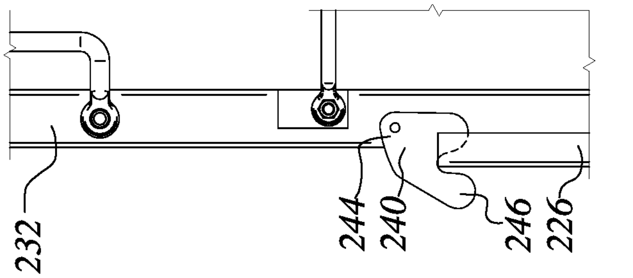
FIG. 8*d* is a an enlarged detail of the latch of FIG. 8*c* in a latched position.
Figure 8C:
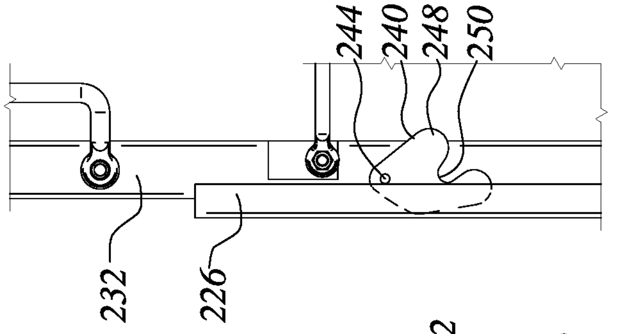
FIG. 8*c* is an enlarged detail of a latch of the access fitting of FIG. 8*a* shown in a passive, unlatch condition.
Figure 8B:
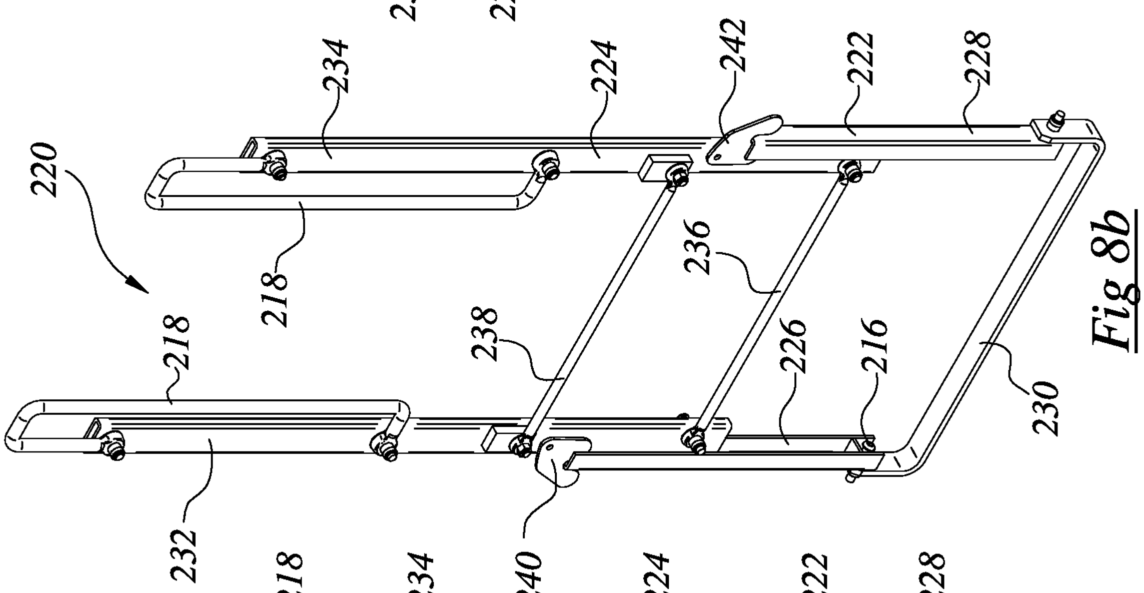
FIG. 8*b* is an isometric view of the assembly of FIG. 8*a* in a deployed position.
Figure 8A:
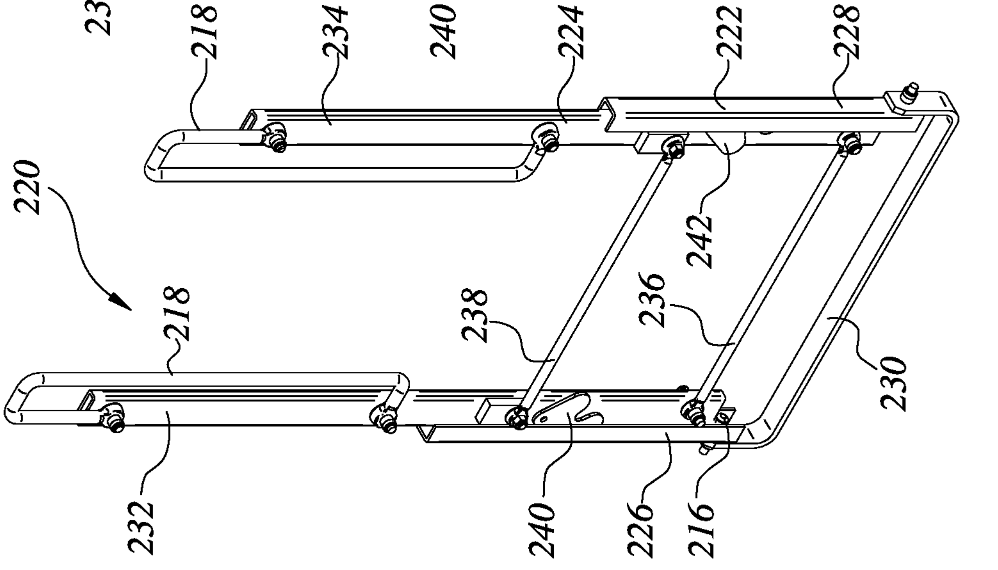
FIG. 8*a* is an isometric view of an alternate embodiment of access fitting assembly for the railroad well car of FIG. 1*a*; in a retracted position.

In the embodiment of FIGS. 8*a* and 8*b*, a trackside accessible deck access assembly, or ladder assembly 220 includes a stationary portion 222 and a movable portion 224. Stationary portion 222 includes left and right hand parallel, spaced apart stanchions or frame members 226, 228 that are rigidly mounted to the body of car 20. Stationary portion 222 also includes a lower step 230 that is formed of a U-shaped rung rigidly mounted to frame members 226, 228.

Movable portion 224 includes first and second, or left hand and right hand parallel, spaced apart uprights 232, 234 that are connected by rigidly mounted second and third, or middle and upper, ladder steps or rungs 236, 238 respectively. Movable portion 224 in effect forms a movable car in which uprights 232, 234 engage, and are guided by their engagement with, frame members 226, 228, which effectively function as guide rails. A handhold or handgrab 218 is mounted to each of movable uprights, each handhold 218 having a generally rectangular form having a short leg protruding upwardly from upright 232, 234, a short laterally inward leg, a long depending leg that forms the main portion of handhold 218, and a short lateral return leg connected at a fixed lower mounting to upright 232, 234.

The lower limit of travel of movable portion 224 is established by abutments or stops 216 mounted to the lower regions of frames 226, 228 respectively, typically on the inside face thereof at the lowermost extremity. The upper limit of travel, or the upper position of movable portion 224 relative to stationary portion 222 is governed by releasable indexing members, or releasable engagement members, such as indicated by first and second, left hand and right hand cam members 240, 242.

Cam members 240, 242 are mounted part-way up uprights 232, 234, such that even when deployed in the upwardly extended position, the lower portions or regions of uprights 232, 234 continue to engage, i.e., overlap, the upward portions of frame members 226, 228, thereby continuing to constrain relative position and motion along a vertical axis of position and displacement. Cam members 240, 242 are movable between a passive, or disengaged condition, in which they ride inside frame members 226, 228 respectively; and an active, extended, deployed or engaged position or condition in which they extend laterally proud of a corresponding mating portion of frame members 226, 228. That corresponding member could be a slot or hole, or seat formed in frame members 226, 228, or, as illustrated, may be the uppermost end of frame members 226, 228.

Cam members 240, 242 are biased toward their respective deployed conditions for retaining the ladder in the raised position. Cam members 240, 242 could be spring-biased members. In the example shown they are gravity-biased. That is, as seen in the enlarged detail of FIG. 8*c*, each cam member 240, 242 has a body having a pivot point (in the form of a hole 244) for seating on a pin fixed to frame member 226 or 228 as may be. The pivot point is close to the margin of the stationary member that is closest to the respective moving upright. The body also has two lower, outboard and inboard, lobes 246, 248 and a slot or notch 250 formed between the lobes. The lobes are chamfered or smoothly radiused. When the ladder is in the lowered position, cam 240 (or 242) is rotationally deflected such that the center of gravity of cam 240 (or 242) lies inside the vertical plane of the pivot pin, and the opposite edge of cam 240 is urged against the stationary member by the displaced weight. When the ladder is raised clear of the end of the stationary member, the weight of the cam causes it to rotate laterally outboard as soon as it clears the upper edge of the stationary frame member. When the movable portion is lowered, the top edge catches on the underside of the outboard lobe 246, and is captured in notch 250. To release the cams, the movable portion is raised to disengage notch 250. Then the outside lobes are pressed inward by the operator, until the outside slope of the lobe is inward of the upper edge of the stationary member. The edge will then ride against the radiused, or chamfered outside edge of the lobe, causing it to deflect further inward, and permitting the raised portion of the ladder to retract.

Thus, in summary, trackside accessible deck access assembly 220 has a stationary portion 222 that is fixed to car 20 and a movable portion 224 that is guided by the fixed section, as illustrated in FIGS. 8*a* and 8*b*. In the stowed position (FIG. 8*a*) movable portion 224 is supported by fixed stops 216, and serves to provide left and right hand handholds 218 that an operator could use to ride the car while standing on first step 230. To position the movable portion 224 in its deployed position, as shown in FIG. 8*b*, the operator slides movable assembly or portion 224 upwards till it clears the cam-locks 240, 242. When the cam-lock clears the top end of frame members 226, 228, the weight of lobe 248 causes outward rotation of the body of the respective cam lock such that notch 250 of cam-lock 240 (or 242) is opened to the top edge of the web of member 226 (or 228), and, when movable portion 224 is then lowered, that upper edge is caught between lobes 248 and 246. As so engaged, the extended upper ladder portion 224 is supported in the deployed position. To lower the movable upper ladder portion, the movable portion is lifted clear of the cam-lock 240 and cam-lock 242, which are then moved out of the way and then the movable portion is lowered down to the stowed position. The bottom horizontal part, namely second ladder rung 236 of the movable portion could be used as a step in the deployed position.

Figure 9A:
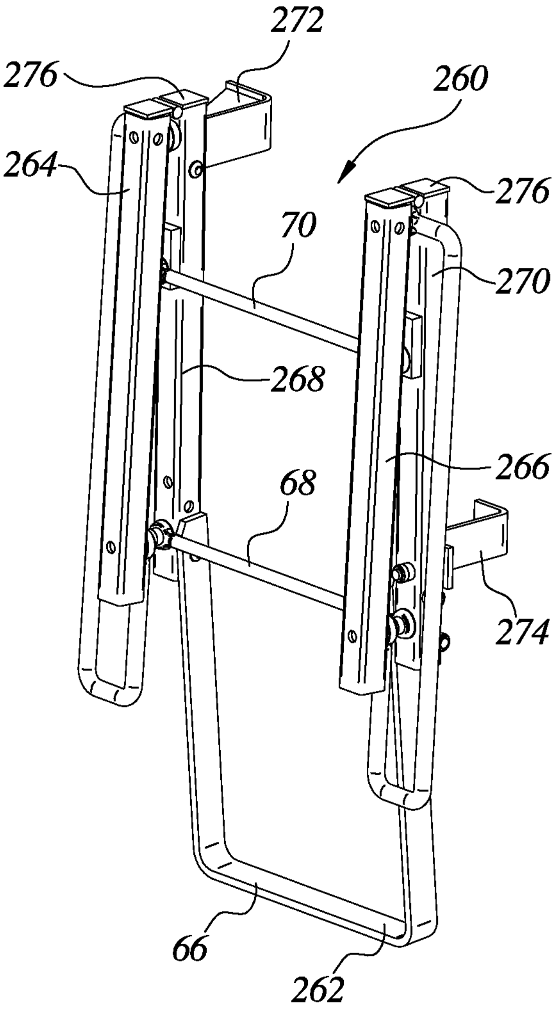
FIG. 9*a* is an isometric view of an alternate access fitting assembly for the railroad well car of FIG. 1*a*; in a folded position.
Figure 9B:
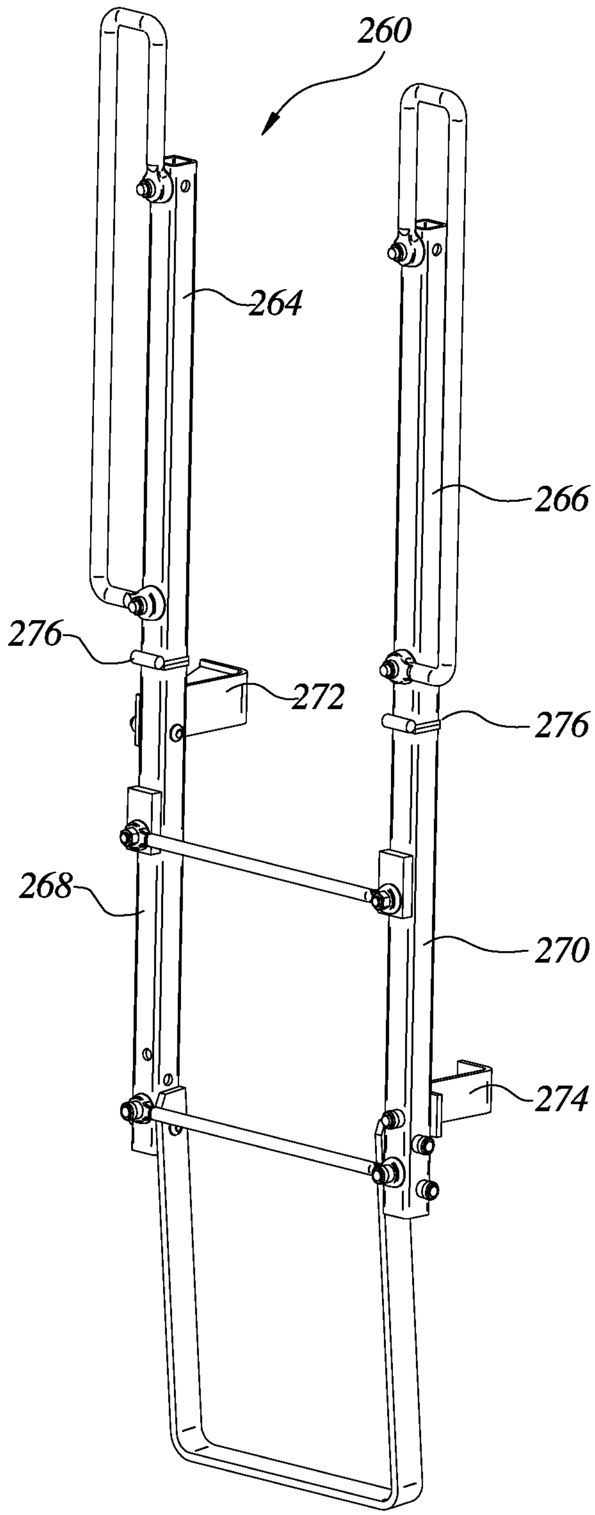
FIG. 9*b* is an isometric view of the access fitting assembly of FIG. 9*a* in a deployed position.
Figure 9C:
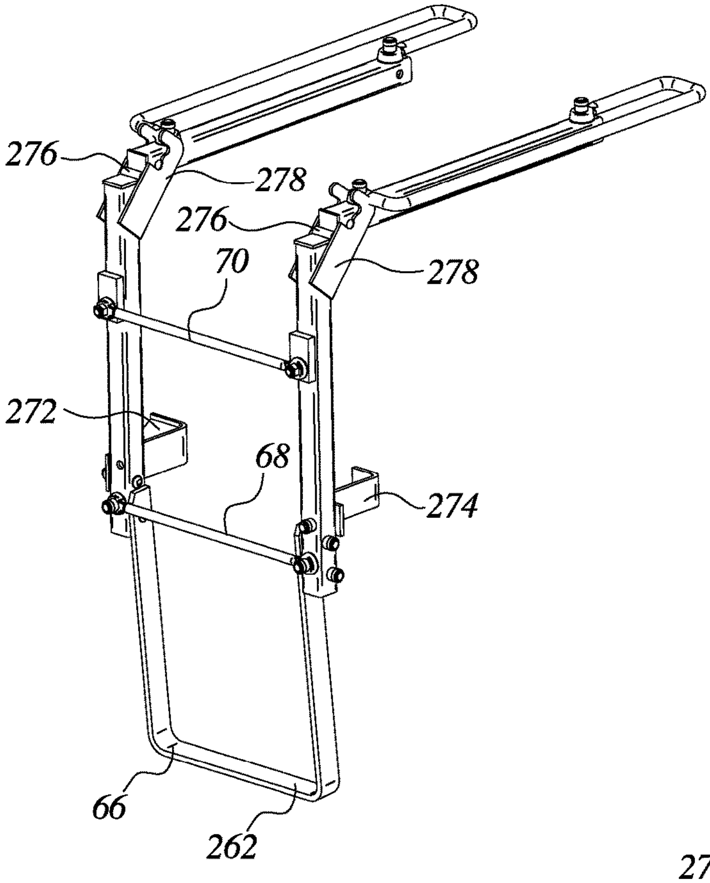
FIG. 9*c* is an isometric view of an alternate access fitting assembly for the railroad well car of FIG. 9*a*; in a folded position.
Figure 9D:
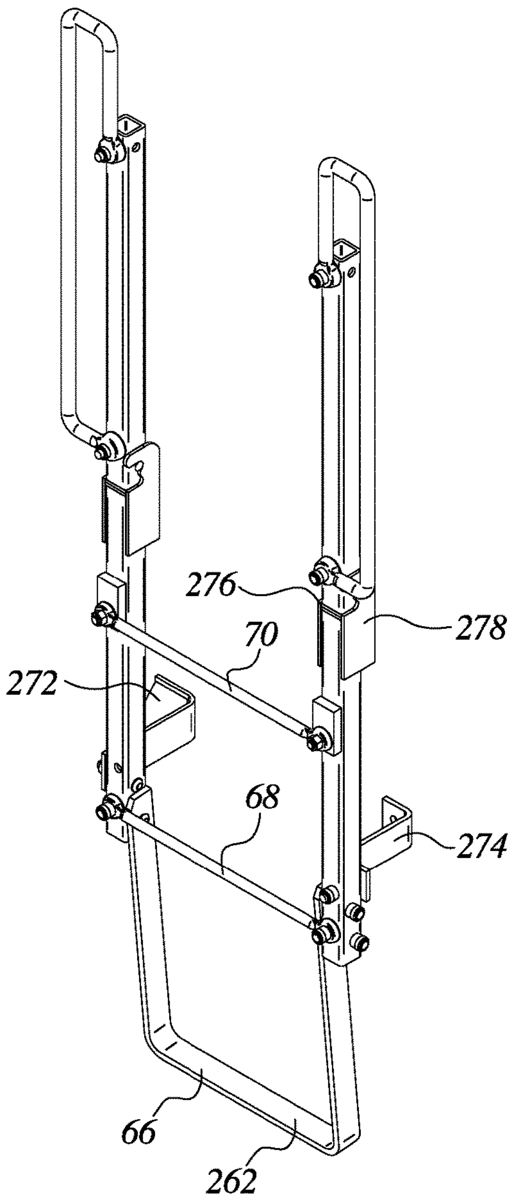
FIG. 9*d* is an isometric view of the access fitting assembly of FIG. 9*c* in a deployed and latched position.

In the further embodiment of FIGS. 9*a* and 9*b*, a track-side-accessible ladder assembly 260 has a stationary lower portion 262 and movable upper portions 264, 266, the upper portions being hingedly mounted. Lower portion 262 includes rigidly mounted left hand and right hand stanchion lower portions 268, 270. There is a lowermost or first step 66 and second and third rungs 68 and 70 as described above. Brackets 272, 274 extend inboard from lower portion 262, and are used to mount assembly 260 to the body of car 20.

Upper portions 264 and 266 are mounted at hinges 276. In the embodiment of FIG. 9*a*, the hinges allow upper portions 264 and 266 to fold outward away from the car body, and to hang downwardly in the outboard storage position. In the embodiment of FIG. 9*b*, the hinges are reversed and allow the upper portions to fold inwardly over the body of the car, as where there may be a walkway or other platform. Two-position hinge locks 278 are provided to secure upper portions 264, 266 in the respective deployed and lowered positions or conditions.

Thus, in summary, the hinged ladder assemblies 260 are allowed to rotate out of the way into their respective stowed positions. To deploy, the upper portion, identified as the ladder stile is rotated and locked in place for the operator needs to access the car. In this rotatable handhold concept, the hinge connects the two assemblies. The lower one, 262, is fixed and attached to the body of car 20. Upper assembly, 264, is hinged to lower assembly 262. The upper assembly is deployed by unlocking the upper assembly, and is rotated to the vertical, deployed position and locked in place for the operator to access car 20. When outside car 20 at trackside, the operator unlocks upper handhold assembly, and rotates it to the lower stowed position, and locks it in place. The rotation could be to the outside of the car for the 40' cars where there is enough space clearance in plate H, for example. For 53' cars, the handhold assembly may be rotated to the inside of the car as there may not be enough clearance space in plate H outside the car. In this design, the upper portion of the vertical handholds can be stowed by rotating the handholds sideways or along the car body. The raised and lowered positions can be secured by applying a pin/slot locking mechanism.

Figure 10A:
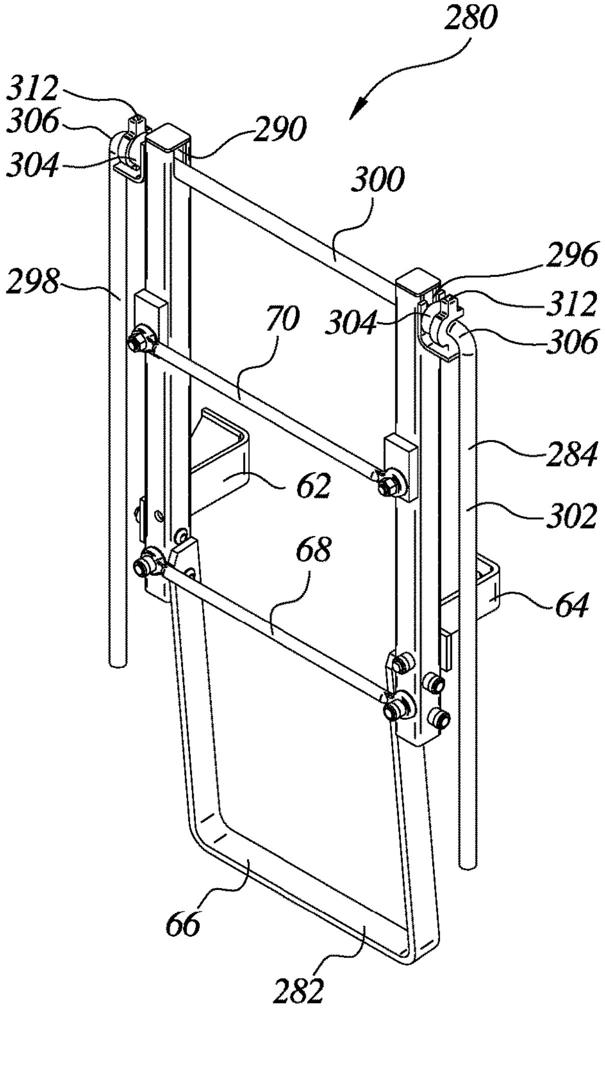
FIG. 10*a* is an isometric view of an access fitting assembly for the railroad well car of FIG. 1*a*; in a retracted position.
Figure 10B:
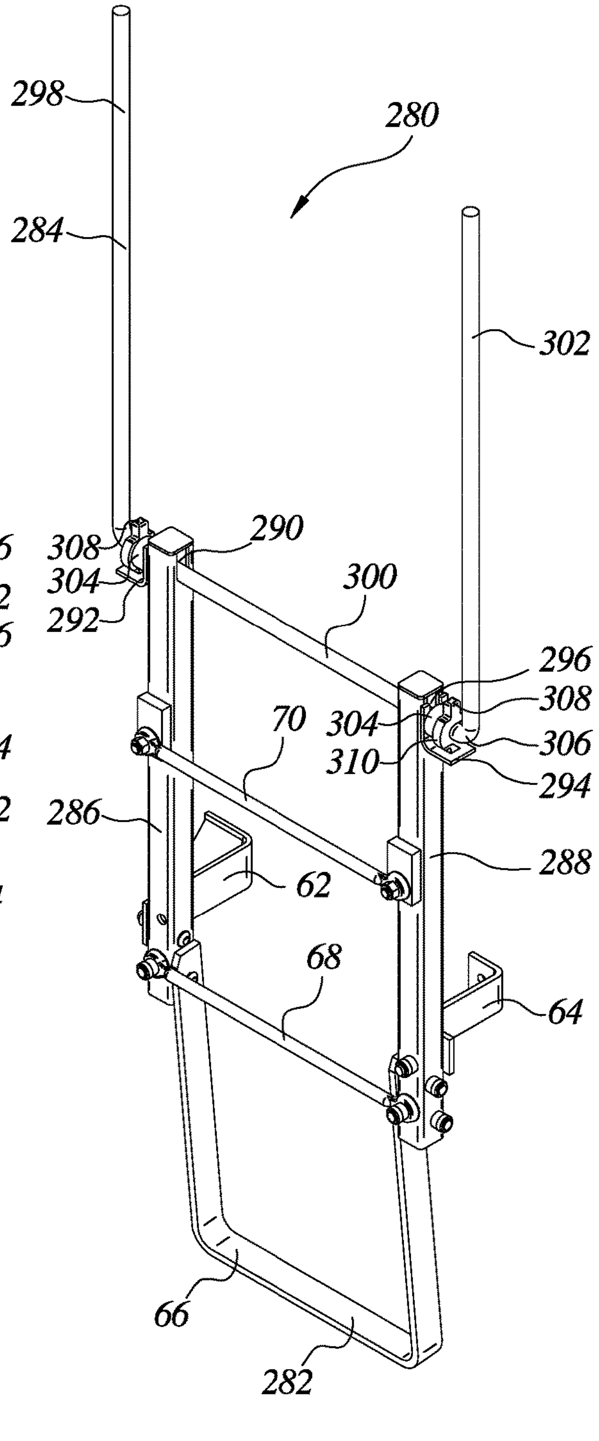
FIG. 10*b* is an isometric view of the access fitting assembly of FIG. 10*a* in a deployed position.

In the embodiment of FIGS. 10*a* and 10*b*, there is a trackside accessible deck access assembly, or ladder assembly 280. It includes a first, lower, stationary portion 282, and a second, upper, movable portion 284. Stationary portion 282 is substantially the same as stationary portion 52. It has left and right stanchions 286, 288. The upper ends of stanchions 286, 288 each have a slot or clevis 290 formed therein, the slot being oblong or oval with the major axis of the slot being vertical, and being capped to prevent escape of movable portion 284. Angle irons, or brackets 292, 294 are mounted to the outside face of the top end of each stanchion, with the vertical leg of the angle being mounted to the post, and being bifurcated to correspond to slot 290. The horizontal leg extends laterally away from the post. The distal portion of the leg has an opening 296 formed therein. Opening 296 may not necessarily be round, and may have the form of a square-sided or rectangular key-way.

Movable portion 284 may have the general form of a bent U-shaped bar, in which the left and right hand legs 298, 302 are joined by a straight back 300. Straight back 300 also acts as the third, or uppermost, rung of ladder assembly 280. The ends of back 300 seat in the left and right hand slots, or devises 290. A bushing 304 is mounted at each end of back 300, between the associated leg 298, 302 and the bracket 292, 294. Back 300 is thus restrained axially, but capable of rotation about its axis. Angular locking members, or indexing members, or engagement members 306 are mounted at each end of back 300 outboard of bushing 304. Locking member 306 includes a pin, or stub, or nipple, or key 310 that is shaped to fit in mating engagement in opening 296. To that object, the teeth 308 and 312 of key 310 may be chamfered or have a rounded or tapered lead-in. When movable portion 284 is in its lowered or retracted condition, key 308 seats in opening 296.

To move from the lowered or retracted position to the raised or extended position, rod 300 is first grasped and raised in the vertical direction, thereby unseating respective teeth 308 of keys 310. Movable portion 284 is then angularly rotated until tooth 312 is presented to opening 296, at which point back 300 is lowered such that teeth 312 engage the sockets defined by opening 296. This prevents turning of movable portion 284 while the stiles, or handgrabs or handholds defined by legs 298 and 302 are in the upwardly extending orientation.

In summary, ladder assembly 280 has lower fixed stile assembly, or movable portion 282 similar to many of the embodiments described above. Upper movable portion 284 is a U-shaped 1" bar or tube capped at the two ends for supporting the handholds and steps. At the two uppermost corners a locking lever, namely key 310, is welded to secure the handholds at the stowed and deployed position, as shown in FIGS. 10*a* and 10*b*. The handholds, i.e., legs 298 and 302, are moved up by the operator from the middle horizontal portion, step, in one hand and the other hand on one vertical side handhold to disengage the locking lever from the slot, then rotate the vertical side handhold upward to the deployed position to access the car. The levers are to be locked in the slots or hole of the plate to keep the handholds secure in the deployed position. When the operator leaves the car, he or she lifts the handholds and rotate them downward to the stowed position and push it down to engage the lever in the slot for locking in the stowed position.

In the embodiments of FIGS. 11*a*-14*b*, the various ladder assemblies are attached to car 20 by springs. The springs are strong enough to have only modest deflection due to use by an operator obtaining to access the car. The springs will deflect more during loading or unloading of car 20 if subject to impact by the load. This relatively benign deflection may tend to reduce the damage to the ladder assemblies. After the load is removed the spring may tend to return the ladder stile back to its original position.

Figure 11A:
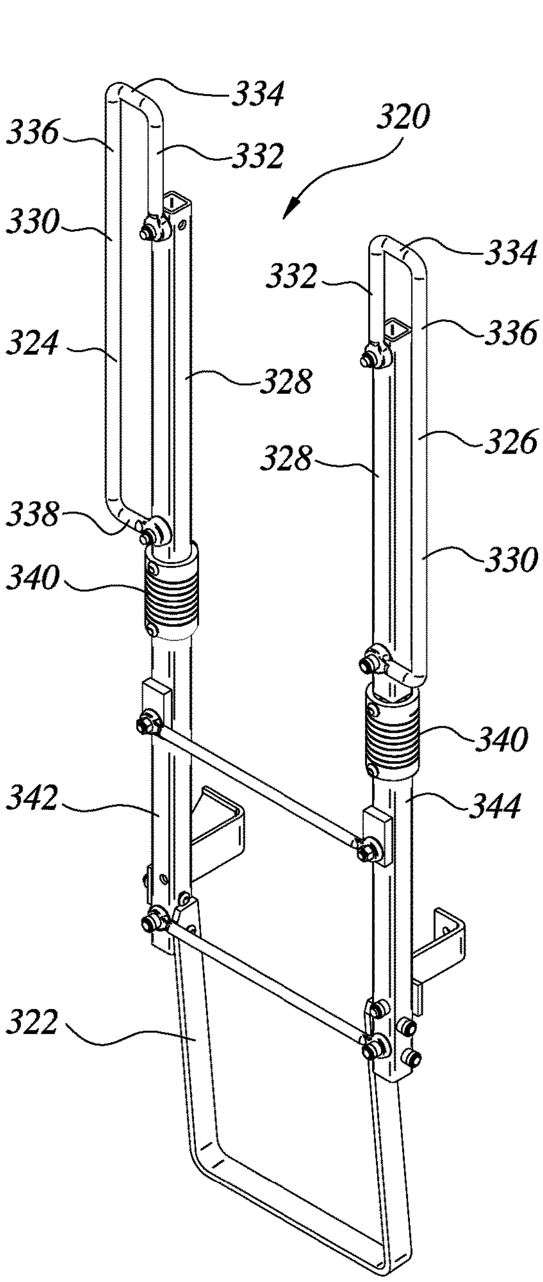
FIG. 11*a* is a perspective view of an alternate embodiment of resilient access fitting assembly for the railroad well car of FIG. 1*a;*
Figure 11B:
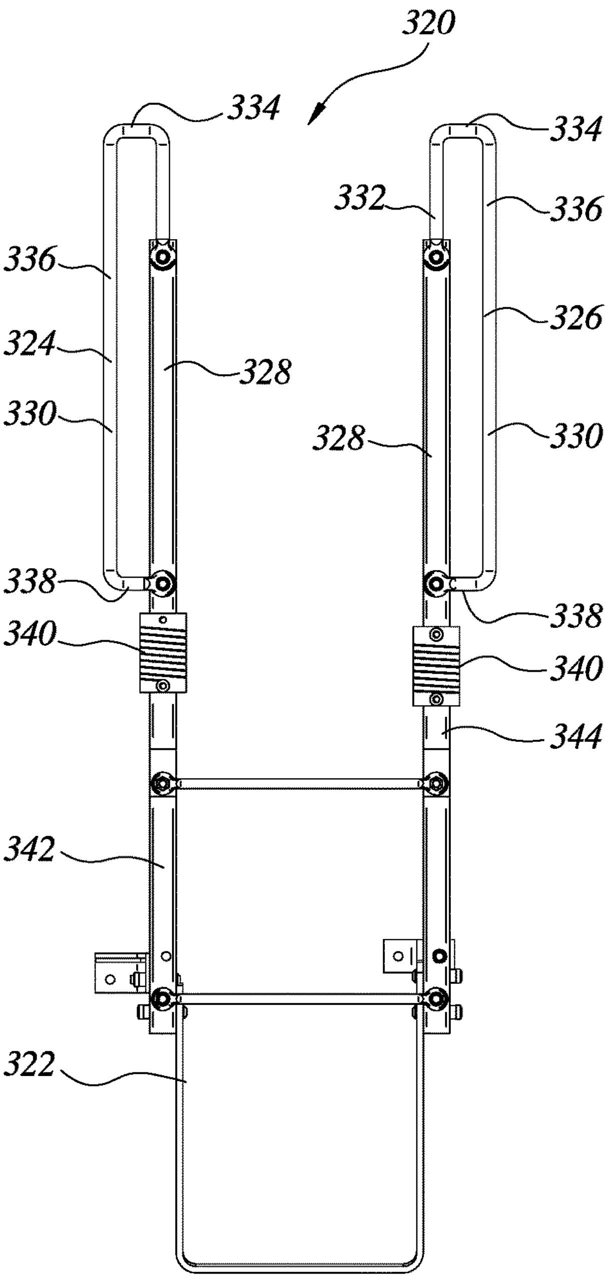
FIG. 11*b* is an alternate perspective view of the assembly of FIG. 11*a*.

In the embodiment of FIGS. 11*a* and 11*b*, there is a trackside accessible deck assembly, or ladder assembly, 320. It includes a first or stationary portion 322 and first and second movable portions shown as left and right hand hold assemblies 324, 326. Stationary portion 322 is substantially the same as stationary portion 52 described above. Each of movable left and right hand handhold assemblies 324, 326 includes a rigid rod, or bar, or post or tube, 328, and a railing or hand grip member, identified as handle 330. Handle 330 includes a first vertical portion 332 rigidly mounted to, and extending upwardly from the upper end of tube 328; a second short, laterally outwardly extending portion 334; a long depending portion 336 hanging substantially parallel to vertical portion 332 and to tube 328; and a short laterally inwardly extending termination 338 that is rigidly secured to a lower region of tube 328.

Coil springs 340 are mounted about the upper end of stanchions 342 and 344 of stationary portion 322, and about the bottom ends of tubes 328. There is slope continuity between each stanchion and the associated coil spring 340; and also slope continuity between each spring and the bottom end of tube 328. Coil spring 340 functions as a resilient coupling between the stanchions and the handhold assembly tubes 328. Coil springs 340 are quite stiff, so that their deflection is only very slight under the full weight of person. However, in the event that handhold assembly 324 or 326 should encounter a solid object—such as a shipping container being carried into place the spring will deflect to allow that object to pass. In effect, springs 340 function as a mechanical fuse, being the mechanically soft link in the assembly. Impact that might otherwise tend to damage or destroy the handhold assemblies may then tend to be taken up in the springs, instead. When the cause of the deflection ends, the coil springs may tend resiliently to return the assembly to the undeflected position or condition.

Figure 12A:
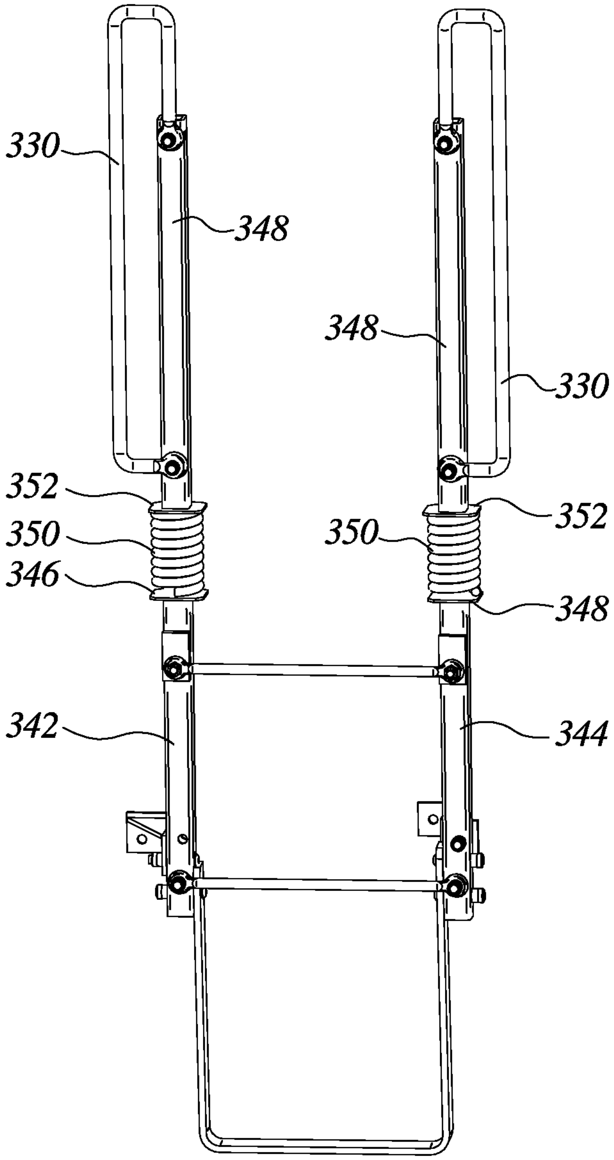
FIG. 12*a* is a perspective view of an alternate embodiment of resilient access fitting assembly to that of FIG. 11*a;*
Figure 12B:
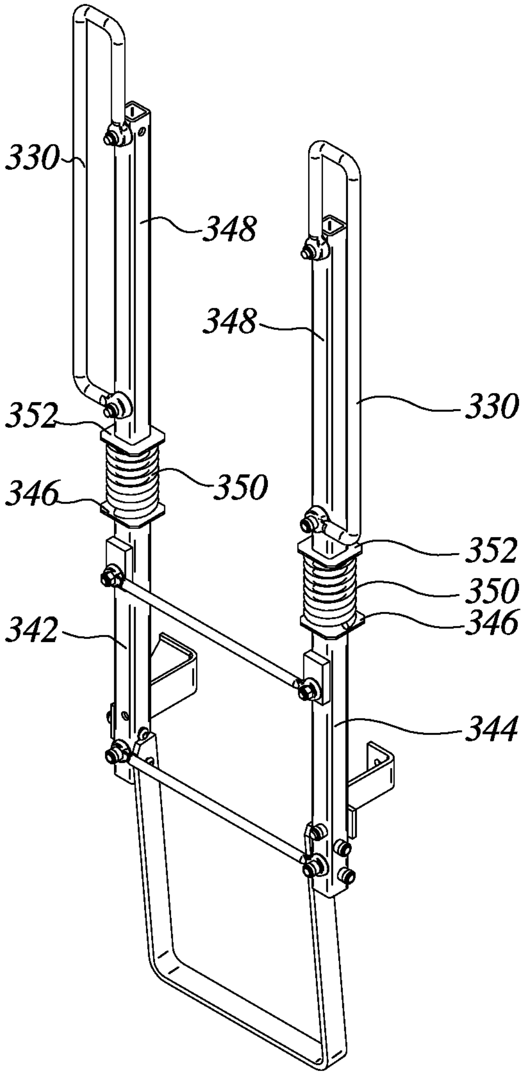
FIG. 12*b* is a perspective view of the access fitting assembly of FIG. 12*a*.

In the alternate embodiment of FIGS. 12*a* and 12*b*, rather than wrapping about the end portions of the stanchions and the handholds, stanchions 342, 344 terminate at welded end plates 346. Handhold tubes 348 are likewise capped at their bottom ends by welded plates 352. Coil springs 350 are then in turn welded to plates 346 at one end, and 352 at the other, once again giving slope continuity at either end. As before, being softer than the adjacent members, springs 350 function as mechanical fuses, that deflect to protect the handholds from damage.

Figure 13C:
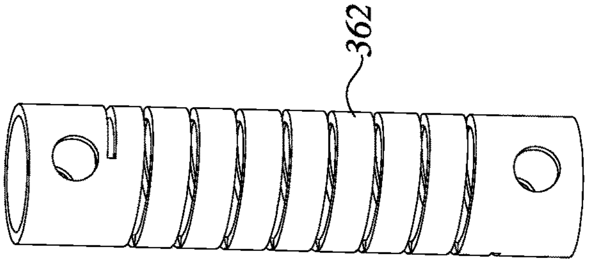
FIG. 13*c* shows a coil spring for the embodiment of FIGS. 13*a* and 13*b*.
Figure 13B:
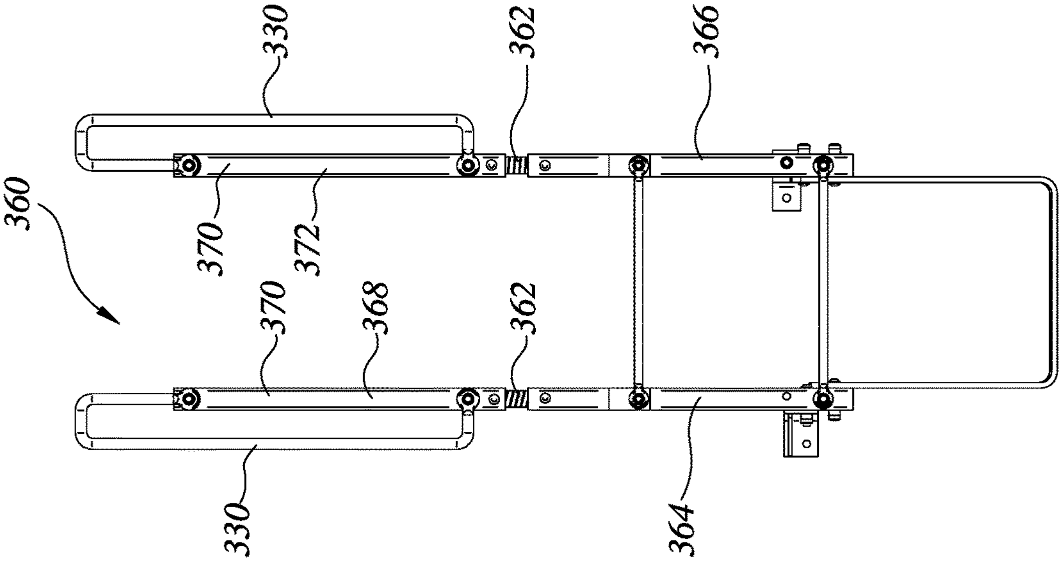
FIG. 13*b* is an alternate perspective view of the assembly of FIG. 13*a;*
Figure 13A:
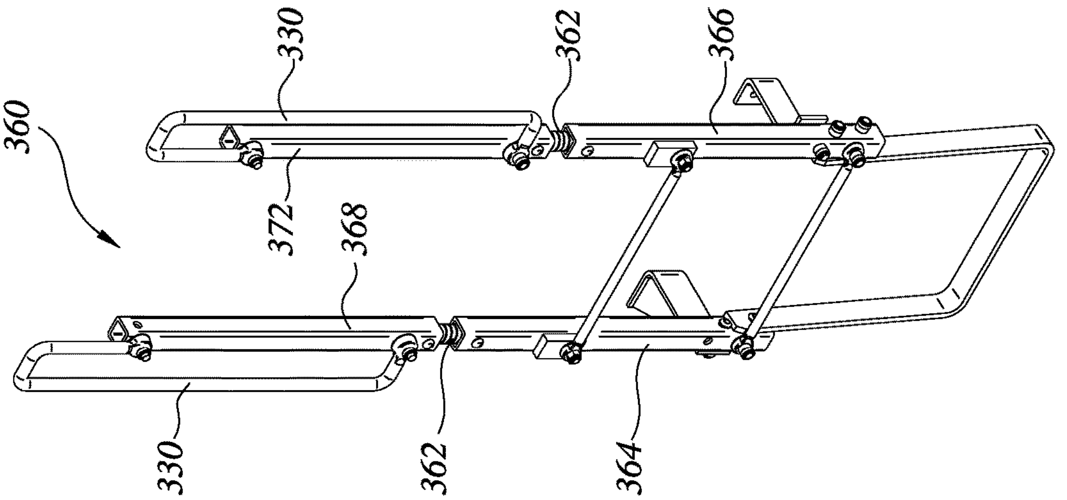
FIG. 13*a* is a perspective view of an alternate embodiment of resilient access fitting assembly to that of FIG. 11*a;*

In the alternate embodiment of FIGS. 13*a*, 13*b*, and 13*c*, ladder assembly 360 employs springs 362 that are mounted internally within the sockets defined by the hollow tubes of stanchions 364, 366, and by the hollow tubes 368, 372 of handhold assemblies 370.

Figure 14:
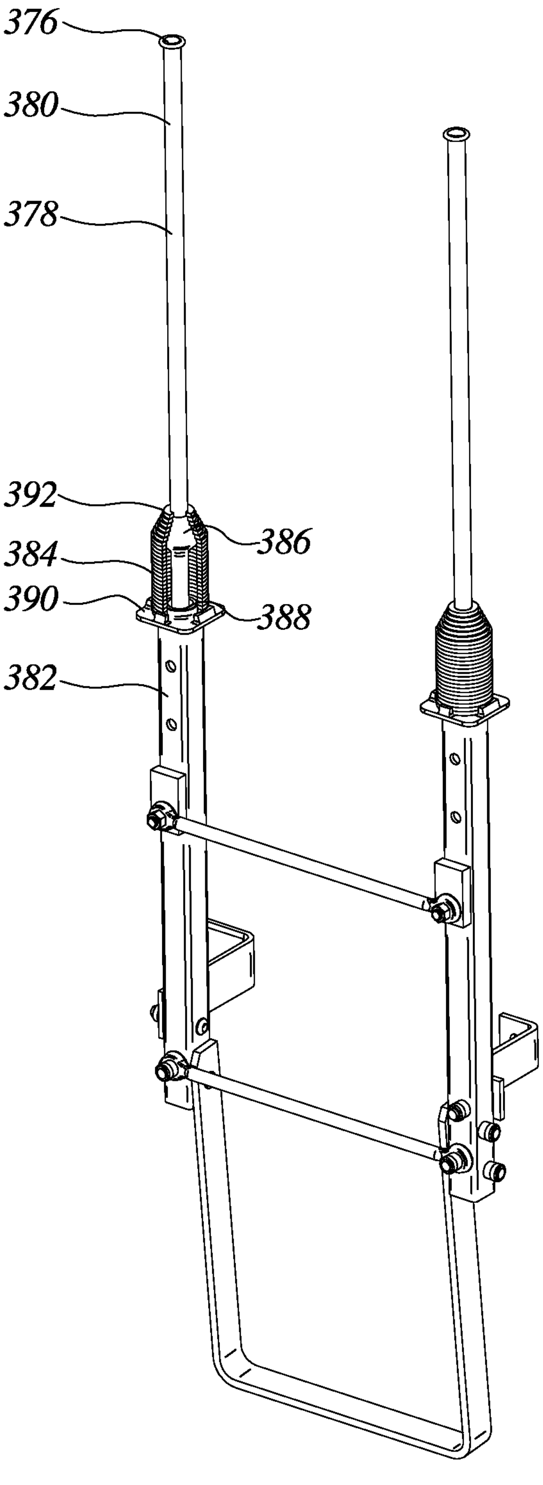
FIG. 14 is a perspective view of an alternate embodiment of resilient access fitting assembly to that of FIG. 11*a*.

In the further alternate embodiment of FIG. 14, handhold assembly 380 includes an upright 378 that is mounted above, and extends upwardly away from a stanchion 382. It has an enlarged upper end piece as at 376. A spring 384 is provided. The lower end 392 of spring 384 is cylindrical, and is welded to the top plate of the stanchion. The upper end 394 of spring 384 is conical, and is secured about a mating conical cuff 386. The lowermost end 388 of upright 378 extends downward to meet the top of stanchion 382. The upwardly facing end of stanchion 382 may include a female socket 390, which may be substantially spherical. The ball-and socket connection so defined acts as a pivot point, and the spring acts at the level of the cuff to discourage displacement, to permit upright 378 to deflect.

The increase in the length of the handholds tends to make them more vulnerable to damage by containers during loading and unloading. The new features of the various options makes the ladder stiles less vulnerable to damage during loading and unloading of the car. The various embodiments of ladder assemblies include ladder stiles made from pipe that would be inexpensive to replace. In the embodiments of FIGS. 2*a*-10*b*, the features and assemblies described are to protect the access ladder assemblies during loading and unloading of containers. They have two positions, one position when stowed and the other position when deployed for the operator to access the car. The stowed position is having the safety appliances lower to reduce the vulnerability of damage during loading/unloading of containers. We also have one design option with the safety appliances have one position but it is loaded with springs that will be strong enough to have very small deflection when used by the operator to access the car and deflect more to dampen the forces from the containers during loading or unloading. The embodiments of FIGS. 2*a*-10*b* reduce the height of the handhold assemblies during loading and unloading of containers. The embodiments of FIGS. 11*a*-14*b* retain the height but provide compliant elements that deflect, to soften the forces of impact during loading and by the use of spring loaded handholds.

Various embodiments have been described in detail. Since changes in and or additions to the above-described examples may be made without departing from the nature, spirit or scope of the invention, the invention is not to be limited to those details.

We claim:

1. A trackside access assembly for a railroad freight car, said access assembly comprising:
- a fixed portion mounted to body structure of said railroad freight car;
- a movable portion mounted to said fixed portion;
- said movable portion including left hand and right hand handholds;
- said movable portion being resiliently displaceable relative to said fixed portion; and
- said left hand handhold is mounted to a first spring and said right hand handhold is mounted to a second spring.

2. The trackside access assembly of claim 1 wherein said movable portion includes at least one spring, said spring being connected to one of (a) said fixed portion; and (b) said body portion.

3. The trackside access assembly of claim 2 wherein said spring has slope continuity of connection with both said fixed portion and said movable portion.

4. The trackside access assembly of claim 2 wherein said spring defines a mechanical fuse between said fixed portion and said movable portion.

5. The trackside access assembly of claim 2 wherein said spring is a coil spring; one end of said coil spring defines a socket for an upper part of said fixed portion; and an opposite end of said spring defines a socket for a lower part of said movable portion, said coil spring defining a flexible coupling between said fixed portion and said movable portion.

6. The trackside access assembly of claim 2 wherein said spring has a first end mounted inside said fixed portion and a second end mounted inside said movable portion.

7. The trackside access assembly of claim 2 wherein said spring has a first portion that is cylindrical, and a second portion that is tapered, said fixed portion and said movable portion has a ball and socket engagement within said spring.

8. A trackside access assembly for a railroad freight car, said access assembly comprising:
- a fixed portion mounted to body structure of said railroad freight car;
- a movable portion mounted to said fixed portion;
- said movable portion being resiliently displaceable relative to said fixed portion;
- said movable portion includes left hand and right hand handholds; and
- said left hand handhold is mounted to a first spring and said right hand handhold is mounted to a second spring, said first and second springs being mounted to said fixed portion.

9. The trackside access assembly of claim 8 wherein said first spring has slope continuity of connection with both said fixed portion and said movable portion.

10. The trackside access assembly of claim 8 wherein said first spring defines a mechanical fuse between said fixed portion and said movable portion.

11. A trackside access assembly for a railroad freight car, said access assembly comprising:
- a fixed portion mounted to body structure of said railroad freight car;
- a movable portion mounted to said fixed portion;
- said movable portion being resiliently displaceable relative to said fixed portion;
- said movable portion includes at least one spring, said spring being connected to one of (a) said fixed portion; and (b) said body portion; and
  - said spring has a first end rigidly welded to said fixed portion and a second end rigidly welded to said movable portion.

12. The trackside access assembly of claim 11 wherein said spring has slope continuity of connection with both said fixed portion and said movable portion.

13. The trackside access assembly of claim 11 wherein said spring defines a mechanical fuse between said fixed portion and said movable portion.

14. The trackside access assembly of claim 11 wherein said spring is a coil spring; one end of said coil spring defines a socket for an upper part of said fixed portion; and an opposite end of said spring defines a socket for a lower part of said movable portion, said coil spring defining a flexible coupling between said fixed portion and said movable portion.

15. The trackside access assembly of claim 11 wherein said spring has a first end mounted inside said fixed portion and a second end mounted inside said movable portion.

16. The trackside access assembly of claim 11 wherein said spring has a first portion that is cylindrical, and a second portion that is tapered; and said fixed portion and said movable portion have a ball and socket engagement within said spring.

17. A trackside access assembly for a railroad freight car, said access assembly comprising:
- a fixed portion mounted to body structure of said railroad freight car;
- a movable portion mounted to said fixed portion; and
- said movable portion being resiliently displaceable relative to said fixed portion; said movable portion includes at least one spring, said spring being connected to one of (a) said fixed portion; and (b) said body portion;
- said spring is a coil spring;
- one end of said coil spring defines a socket for an upper part of said fixed portion; and
- an opposite end of said spring defines a socket for a lower part of said movable portion, said coil spring defining a flexible coupling between said fixed portion and said movable portion.

18. The trackside access assembly of claim 17 wherein said spring has slope continuity of connection with both said fixed portion and said movable portion.

19. The trackside access assembly of claim 17 wherein said spring defines a mechanical fuse between said fixed portion and said movable portion.

20. A trackside access assembly for a railroad freight car, said access assembly comprising:
- a fixed portion mounted to body structure of said railroad freight car;
- a movable portion mounted to said fixed portion; and
- said movable portion being resiliently displaceable relative to said fixed portion;

said movable portion includes at least one spring, said spring being connected to one of (a) said fixed portion; and (b) said body portion;

said spring has a first portion that is cylindrical, and a second portion that is tapered, said fixed portion and said movable portion had a ball and socket engagement within said spring.

21. The trackside access assembly of claim 20 wherein said spring has slope continuity of connection with both said fixed portion and said movable portion.

22. The trackside access assembly of claim 20 wherein said spring defines a mechanical fuse between said fixed portion and said movable portion.

* * * * *